United States Patent
Jung

(10) Patent No.: US 12,300,875 B2
(45) Date of Patent: May 13, 2025

(54) DISPLAY DEVICE

(71) Applicant: LG ELECTRONICS INC., Seoul (KR)

(72) Inventor: Sungbo Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 133 days.

(21) Appl. No.: 17/875,177

(22) Filed: Jul. 27, 2022

(65) Prior Publication Data

US 2023/0035749 A1  Feb. 2, 2023

(30) Foreign Application Priority Data

Jul. 28, 2021 (WO) ............... PCT/KR2021/009783

(51) Int. Cl.
*H01Q 1/24* (2006.01)

(52) U.S. Cl.
CPC .................................. *H01Q 1/243* (2013.01)

(58) Field of Classification Search
CPC ...... H01Q 1/243; H01Q 1/2266; H01Q 5/307; H01Q 5/371; H01Q 5/378; H04M 1/026; H04M 1/0266; G06F 1/1601
See application file for complete search history.

(56) References Cited

U.S. PATENT DOCUMENTS

| | | | | |
|---|---|---|---|---|
| 2013/0271329 A1* | 10/2013 | Sato | ............ | H01Q 9/42 343/720 |
| 2014/0104157 A1* | 4/2014 | Burns | ............ | H01Q 1/243 343/702 |
| 2014/0354888 A1* | 12/2014 | Nakamura | ............ | H01Q 21/28 348/725 |
| 2015/0295302 A1* | 10/2015 | Lee | ............ | H01Q 1/2266 343/702 |
| 2015/0295614 A1* | 10/2015 | Michino | ............ | H04M 1/185 455/575.8 |
| 2020/0212542 A1* | 7/2020 | Yong | ............ | H01Q 9/0407 |

FOREIGN PATENT DOCUMENTS

| | | |
|---|---|---|
| KR | 101284736 | 7/2013 |
| KR | 101421869 | 7/2014 |
| KR | 1020190061161 | 6/2019 |
| KR | 1020190113287 | 10/2019 |
| WO | 2019078826 | 4/2019 |

OTHER PUBLICATIONS

PCT International Application No. PCT/KR2021/009783, International Search Report dated Apr. 26, 2022, 3 pages.

* cited by examiner

*Primary Examiner* — Tung X Le
(74) *Attorney, Agent, or Firm* — LEE, HONG, DEGERMAN, KANG & WAIMEY

(57) ABSTRACT

Disclosed is a display device. The display device of the present disclosure may include a display panel; a frame positioned behind the display panel, and to which the display panel is coupled; and a communication module which protrudes from one side of the frame to an outside of the frame, and extends long along the one side of the frame, wherein the communication module may include: an antenna unit; a housing which provides an internal space in which the antenna unit is positioned; and a side member which is positioned between a side surface of the antenna unit and an inner side of the housing, in a length direction of the communication module.

21 Claims, 20 Drawing Sheets

DISPLAY DEVICE

CROSS-REFERENCE TO RELATED APPLICATION

This application claims the benefit of earlier filing date and right of priority to International Application No. PCT/KR2021/009783, filed on Jul. 28, 2021, the contents of which are incorporated herein by reference in its entirety.

BACKGROUND OF THE INVENTION

1. Field of the Invention

The present disclosure relates to a display device.

2. Description of the Related Art

As the information society develops, the demand for display devices is also increasing in various forms. In response to this, various display devices such as Liquid Crystal Display Device (LCD), Organic Light Emitting Diode (OLED), and Micro LED have been researched and used in recent years.

Among them, an LCD panel includes a TFT substrate and a color substrate that face each other with a liquid crystal layer interposed therebetween, and may display an image by using light provided from a backlight unit. In addition, an OLED panel may display an image by depositing an organic material layer capable of emitting light by itself on a substrate on which a transparent electrode is formed. In particular, since a display device having an OLED panel does not require a backlight unit, there is an advantage of being implemented in an ultra-thin shape.

A control box may be spaced from the display device, and be used adjacent to a user. The control box may provide various information to the display device. For example, the control box may be an AV box. The control box may exchange information with a display head equipped with a display panel for displaying an image by wire/wireless.

Recently, a lot of researches have been accomplished on the connectivity of such display device.

SUMMARY OF THE INVENTION

The present disclosure has been made in view of the above problems, and provides a display device having a wireless communication module.

The present disclosure further provides a structure for improving the transmission/reception rate of an antenna of communication module.

The present disclosure further provides a structure in which a beam pattern of a side antenna of communication module is formed to be biased in a forward direction than in a rearward direction of communication module.

The present disclosure further provides a coupling structure of a communication module with respect to a display device.

The present disclosure further provides a coupling structure of an antenna unit with respect to a communication module.

In accordance with an aspect of the present disclosure, a display device may include: a display panel; a frame positioned behind the display panel, and to which the display panel is coupled; and a communication module which protrudes from one side of the frame to an outside of the frame, and extends long along the one side of the frame, wherein the communication module may include: an antenna unit; a housing which provides an internal space in which the antenna unit is positioned; and a side member which is positioned between a side surface of the antenna unit and an inner side of the housing, in a length direction of the communication module.

BRIEF DESCRIPTION OF THE DRAWINGS

The above and other objects, features and advantages of the present disclosure will be more apparent from the following detailed description in conjunction with the accompanying drawings, in which.

DETAILED DESCRIPTION OF THE PREFERRED EMBODIMENTS

Figure 1:
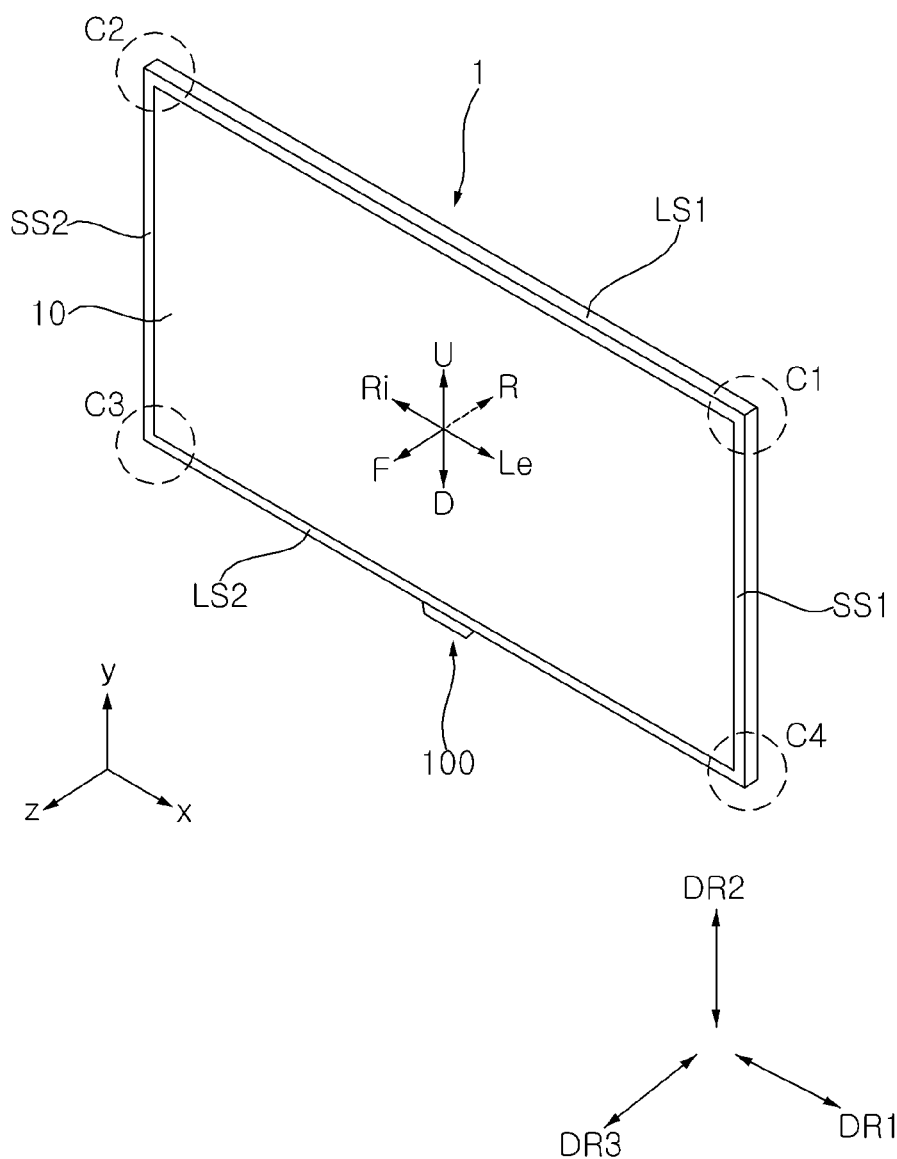
FIGS. 1 to 20 are diagrams illustrating examples of a display device according to embodiments of the present disclosure.

Hereinafter, the embodiments disclosed in the present specification will be described in detail with reference to the accompanying drawings, and the same or similar elements are denoted by the same reference numerals even though they are depicted in different drawings and redundant descriptions thereof will be omitted.

In the following description, with respect to constituent elements used in the following description, the suffixes "module" and "unit" are used or combined with each other only in consideration of ease in the preparation of the specification, and do not have or serve as different meanings.

In addition, in describing the embodiments disclosed in the present specification, if it is determined that detailed descriptions of related known technologies may obscure the gist of the embodiments disclosed in the present specification, the detailed description thereof will be omitted. In addition, the accompanying drawings are provided only for a better understanding of the embodiments disclosed in the present specification and are not intended to limit the technical ideas disclosed in the present specification. Therefore, it should be understood that the accompanying drawings include all modifications, equivalents and substitutions included in the scope and sprit of the present disclosure.

Although the terms "first," "second," etc., may be used herein to describe various components, these components should not be limited by these terms. These terms are only used to distinguish one component from another component.

These terms are only used to distinguish one component from another component. When a component is referred to as being "connected to" or "coupled to" another component, it may be directly connected to or coupled to another component or intervening components may be present. In contrast, when a component is referred to as being "directly connected to" or "directly coupled to" another component, there are no intervening components present.

As used herein, the singular form is intended to include the plural forms as well, unless the context clearly indicates otherwise.

In the following description, even if the embodiment is described with reference to a specific figure, if necessary, reference numeral not shown in the specific figure may be referred to, and the reference numeral not shown in the specific figure may be used in a case where the above reference numeral is shown in the other figures.

Referring to FIG. 1, a display device 1 may include a display panel 10. The display panel 10 may display a screen.

The display device 1 may include a first long side LS1, a second long side LS2 facing the first long side LS1, a first short side SS1 adjacent to the first long side LS1 and the second long side LS2, and a second short side SS2 facing the first short side SS1. Meanwhile, for convenience of explanation, it is illustrated and described that the lengths of the first and second long sides LS1 and LS2 are longer than the lengths of the first and second short sides SS1 and SS2, but it may also be possible that the lengths of the first and second long sides LS1 and LS2 are approximately equal to the lengths of the first and second short sides SS1 and SS2.

A direction parallel to the long side LS1, LS2 of the display device 1 may be referred to as a left-right direction or a first direction DR1. A direction parallel to the short side SS1, SS2 of the display device 1 may be referred to as an up-down direction or a second direction DR2. A direction perpendicular to the long side LS1, LS2 and the short side SS1, SS2 of the display device 1 may be referred to as a front-rear direction or a third direction DR3.

A direction in which the display panel 10 displays an image may be referred to as a forward direction (F, z), and a direction opposite to this may be referred to as a rearward direction R. The side of the first long side LS1 may be referred to as an upper side (U, y). The side of the second long side LS2 may be referred to as a lower side D. The side of the first short side SS1 may be referred to as a left side (Le, x). The side of the second short side SS2 may be referred to as a right side Ri.

The first long side LS1, the second long side LS2, the first short side SS1, and the second short side SS2 may be referred to as an edge of the display device 1. In addition, a point where the first long side LS1, the second long side LS2, the first short side SS1, and the second short side SS2 meet each other may be referred to as a corner.

For example, a point where the first short side SS1 and the first long side LS1 meet may be referred to as a first corner C1. A point where the first long side LS1 and the second short side SS2 meet may be referred to as a second corner C2. A point where the second short side SS2 and the second long side LS2 meet may be referred to as a third corner C3. A point where the second long side LS2 and the first short side SS1 meet may be referred to as a fourth corner C4.

Figure 2:
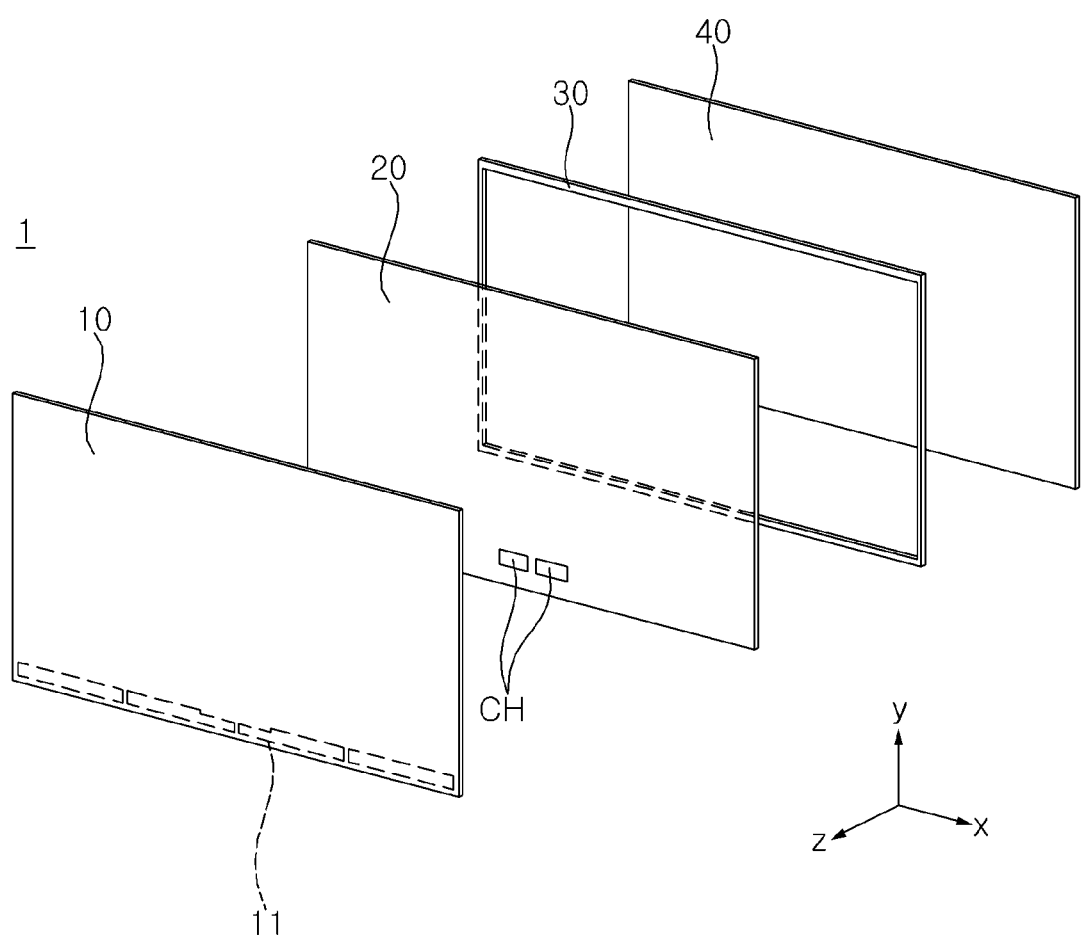

Referring to FIGS. 1 and 2, the display device 1 may include a display panel 10, a frame 20, a side frame 30, and a back cover 40.

The display panel 10 may form the front surface of the display device 1, and may display an image in a forward direction. For example, the display panel 10 may be an OLED panel, an LCD panel, or an LED panel. However, the display panel applicable to the present disclosure is not limited thereto. The display panel 10 may divide the image into a plurality of pixels and output an image by matching color, brightness, and saturation for each pixel. The display panel 10 may be divided into an active area on which an image is displayed and a de-active area on which an image is not displayed. The display panel 10 may generate light corresponding to a color of red, green, or blue according to a control signal.

The frame 20 may be located in a rearward direction of the display panel 10, and the display panel 10 may be coupled to the frame 20. For example, the frame 20 may include a metal material. Meanwhile, the frame 20 may be referred to as a main frame or a module cover.

The side frame 30 may extend along the circumference of the frame 20.

The frame 20 may be coupled to the side frame 30 in a forward direction of the side frame 30. The side frame 30 may cover side surfaces of the display panel 10 and the frame 20. Meanwhile, the side frame 30 may be referred to as a guide panel.

The back cover 40 may be located in a rearward direction of the frame 20, and may be coupled to the frame 20. For example, the back cover 40 may be an injection molding made of a resin material. As another example, the back cover 40 may include a metal material.

Figure 3:
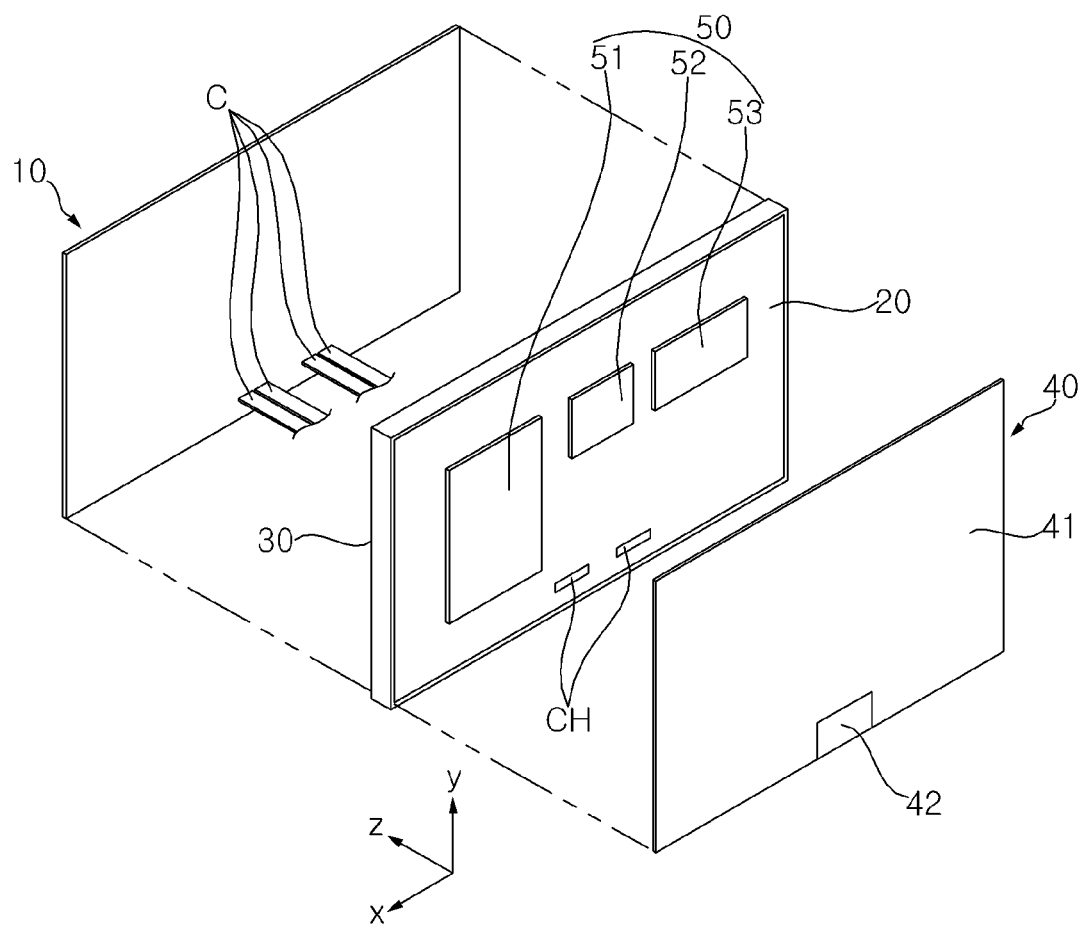

Referring to FIG. 3, boards 50 may be mounted on the frame 20 in a rearward direction of the frame 20. A plurality of electronic devices may be mounted on the boards 50. The board 50 may be a printed circuit board (PCB), and may be electrically connected to electronic components of the display device.

For example, the boards 50 may include a power supply board 51 providing power to each configuration of the display device, a timing controller board 52 providing an image signal to the display panel 10, and a main board 53 for controlling the display device.

Meanwhile, a source PCB (S-PCB) 11 (see FIG. 2) may be adjacent to the lower side of the display panel 10, and may be coupled to the rear surface of the display panel 10. A cable C may penetrate a cable hole CH formed in a lower portion of the frame 20, and may be electrically connected to the S-PCB 11 and the timing controller board 52. Accordingly, the cable C may transmit digital video data and a timing control signal from the timing controller board 52 to the S-PCB 11. For example, the cable C may be a flexible flat cable (FFC).

Figure 4:
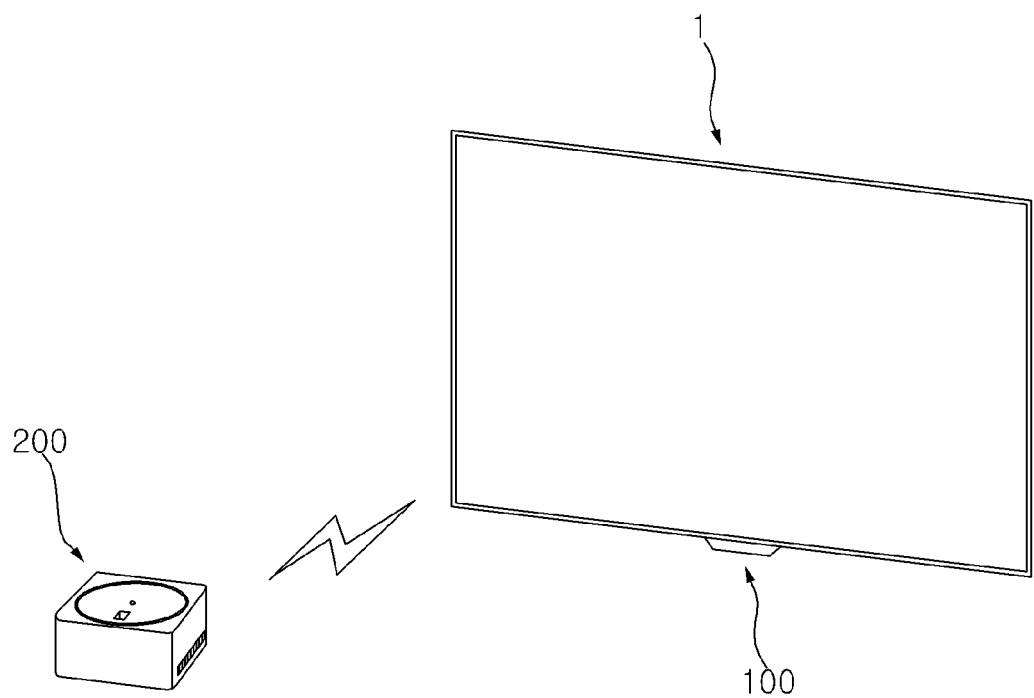

Referring to FIG. 4, a control box 200 may be spaced apart from the display device 1. The control box 200 may be referred to as a set-top box. The control box 200 may wirelessly exchange information with the display device 1. A communication module (not shown) of the control box 200 may perform wireless communication with the communication module 100 of the display device 1. At least a portion of the communication module 100 may protrude outward from an edge of the display device 1. For example, the communication module 100 may protrude downward from the lower side of the display device 1. Accordingly, the communication module 100 can perform wireless communication smoothly with the communication module of the control box 200.

Stability of wireless communication between the control box 200 and the display device 1 may vary depending on the relative position of the control box 200 and the display device 1. A place where the display device 1 is located may be constant in order to maintain a constant distance from the user. The control box 200 needs to increase the degree of freedom of a location where it is located for user convenience.

Meanwhile, the control box 200 may be one configuration of the display device 1. In this case, the display device 1 may be referred to as a head 1.

Figure 5:
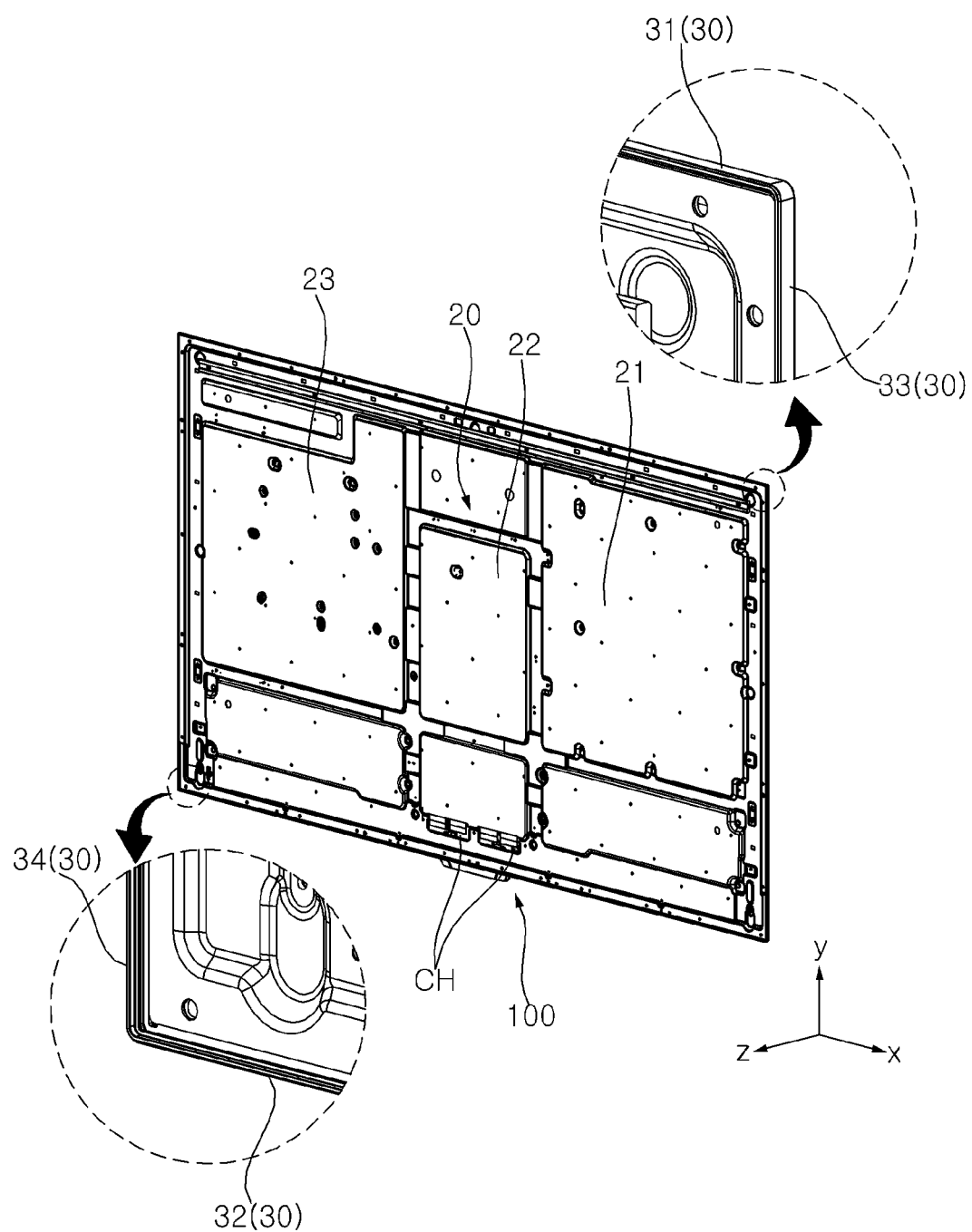

Referring to FIG. 5, the side frame 30 may include a first part 31, a second part 32, a third part 33, and a fourth part 34. The first part 31 may extend along an upper side of the frame 20, and may form a first long side LS1 (see FIG. 1). The third part 33 may be bent downward from the left end of the first part 31, may extend along the left side of the frame 20, and may form a first short side SS1 (see FIG. 1). The second part 32 may be bent to the right from the lower end of the third part 33, may extend along the lower side of the frame 20, and may form a second long side LS2 (see FIG. 1). The fourth part 34 may be bent upward from the right end of the second part 32, may extend along the right side of the frame 20, and may form a second short side SS2 (see FIG. 1).

A first forming portion 21, a second forming portion 22, and a third forming portion 23 may be formed while being pressed in a rearward from the front surface of the frame 20. The first forming portion 21 may be located close to the left side of the frame 20, the third forming portion 23 may be located close to the right side of the frame 20, and the second forming portion 22 may be located between the first forming portion 21 and the third forming portion 23. A power supply board 51 (see FIG. 3) may be mounted in the rear surface of the first forming portion 21. The timing controller board 52 (see FIG. 3) may be mounted in the rear surface of the second forming portion 22. A main board 53 (see FIG. 3) may be mounted in the rear surface of the third forming portion 23.

Figure 6:
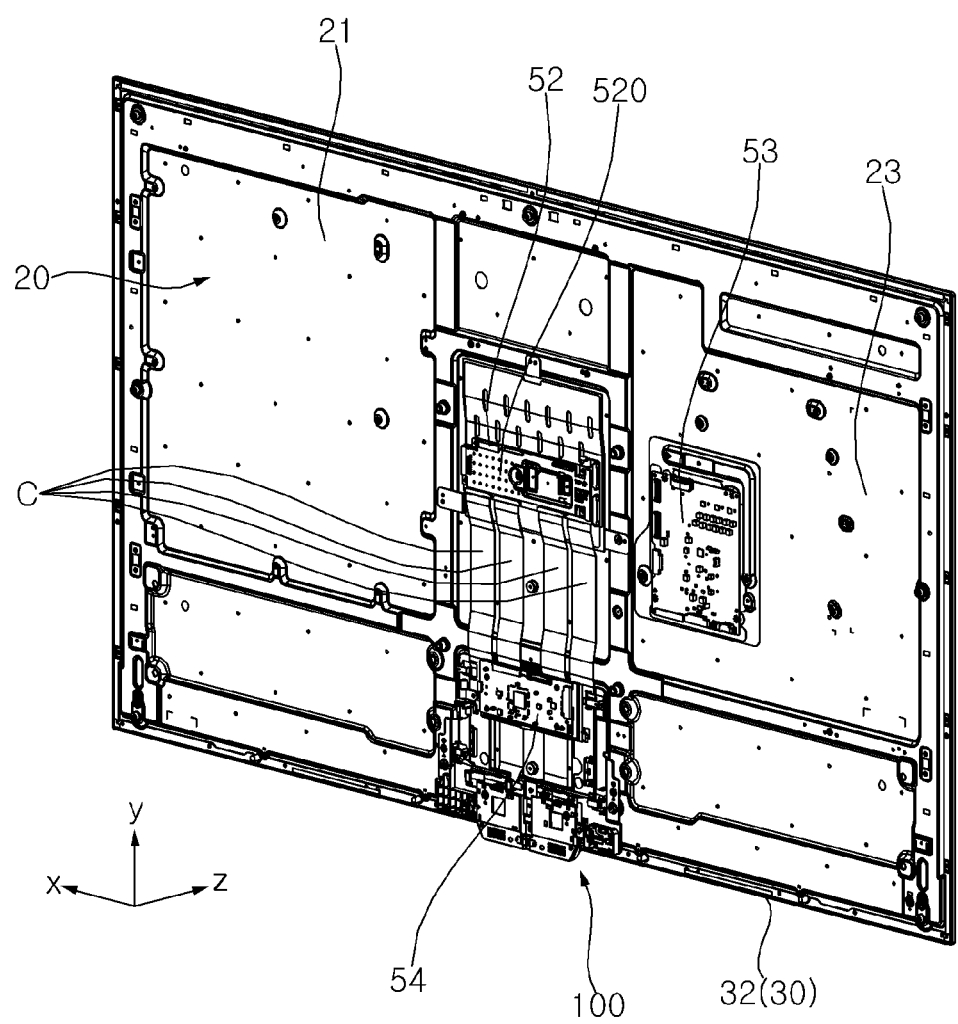

Referring to FIG. 6, a shield plate 520 may be mounted in the rear surface of the timing controller board 52. A first board 54 may be spaced downward from the timing controller board 52, and may be mounted in the rear surface of the frame 20. A second board 53 may be spaced apart from the timing controller board 52 to the right, and may be mounted in the rear surface of the frame 20. A shield plate (not shown) may be mounted in a rear surface of each of the first board 54 and the second board 53. The communication module 100 may receive compressed sound and/or video data from the communication module of the control box 200 (see FIG. 4). The first board 54 may decompress the sound and/or video data received from the communication module 100, convert it, and provide it to the second board 53. The second board 53 may provide data received from the first board 54 to the display panel 10 (see FIG. 3) through the timing controller board 52. In addition, the second board 53 may provide data received from the first board 54 to a speaker (not shown) that is electrically connected to the second board 53 through a cable or the like and is provided in the display device. The first board 54 may be referred to as an RF receiver, an RF processing device, or a wireless audio video (WAV) board. The second board 53 may be referred to as an amplifier (AMP) board. For example, the second board 53 may be the main board 53.

Figure 7:
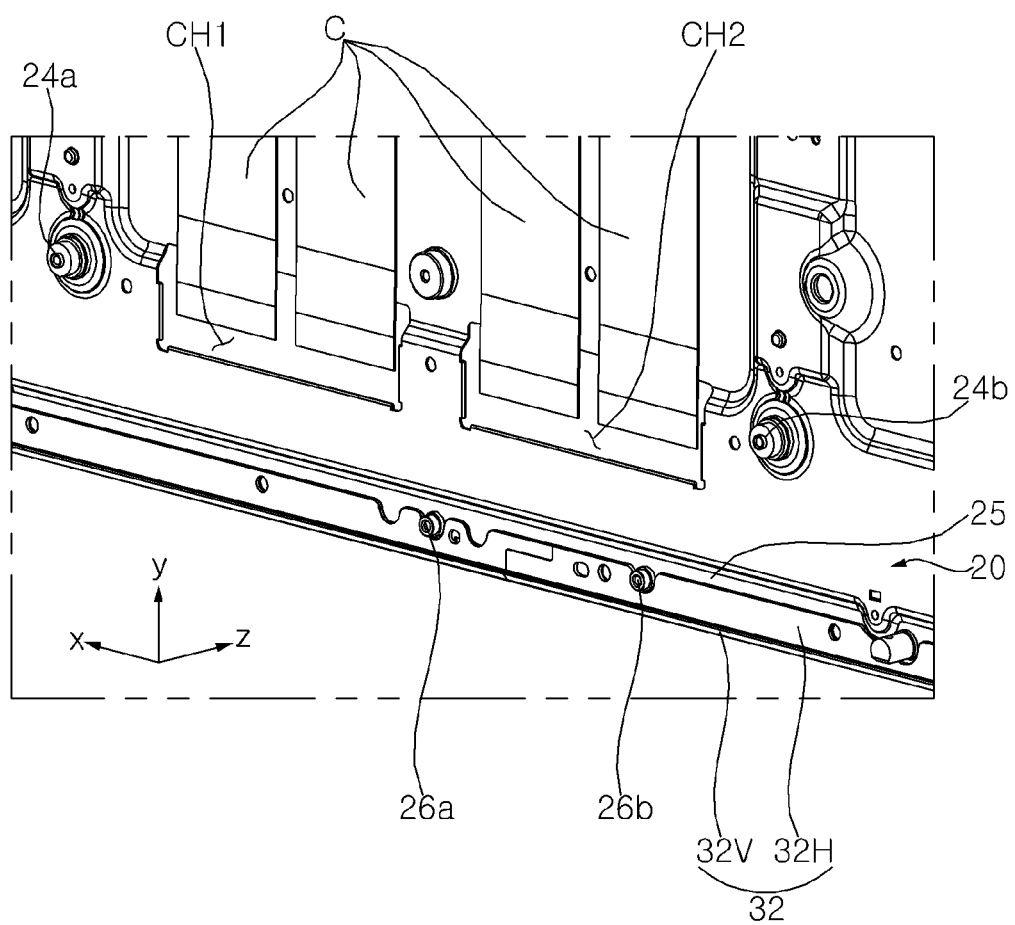

Referring to FIG. 7, a first cable hole CH1 and a second cable hole CH2 may be formed to penetrate the frame 20 in the front-rear direction, and may be adjacent to the second part 32. The first cable hole CH1 may be adjacent to the second cable hole CH2 while being spaced apart from the second cable hole CH2. For example, four cables C may form a pair by two cables, one pair may penetrate the first cable hole CH1, and the other pair may penetrate the second cable hole CH2.

The second part 32 may include a vertical portion 32V and a horizontal portion 32H.

The vertical portion 32V may extend along a lower side of the frame 20 and may form a lower side of the second part 32. The vertical portion 32V may have a width in a direction intersecting with the frame 20. In other words, the length of the vertical portion 32V may be defined in the left-right direction, the width of the vertical portion 32V may be defined in the front-rear direction, and the thickness of the vertical portion 32V may be defined in the up-down direction.

The horizontal portion 32H may protrude from the upper side of the frame 20 toward the rear of the frame 20. The horizontal portion 32H may be disposed parallel to the frame 20 at the rear of the frame 20. In other words, the length of the horizontal portion 32H may be defined in the left-right direction, the width of the horizontal portion 32H may be defined in the up-down direction, and the thickness of the horizontal portion 32H may be defined in the front-rear direction.

Meanwhile, a compression portion 25 may be formed while being pressed forward from the rear surface of the frame 20, and may form the lower side of the frame 20. The front surface of the compression portion 25 may be in contact with the rear surface of the horizontal portion 32H. The horizontal portion 32H may be coupled to or fixed to the compression portion 25.

A lower fixing portion 26a, 26b may protrude from the compression portion 25 toward the horizontal portion 32H, and may penetrate the horizontal portion 32H. A first lower fixing portion 26a may be spaced apart from a second lower fixing portion 26b to the left. An upper fixing portion 24a and 24b may protrude rearward from the frame 20. A first upper fixing portion 24a may be adjacent to the first cable hole CH1, and a second upper fixing portion 24b may be adjacent to the second cable hole CH2.

For example, the lower fixing portion 26a, 26b and the upper fixing portion 24a, 24b may be a pemnut.

Figure 8:
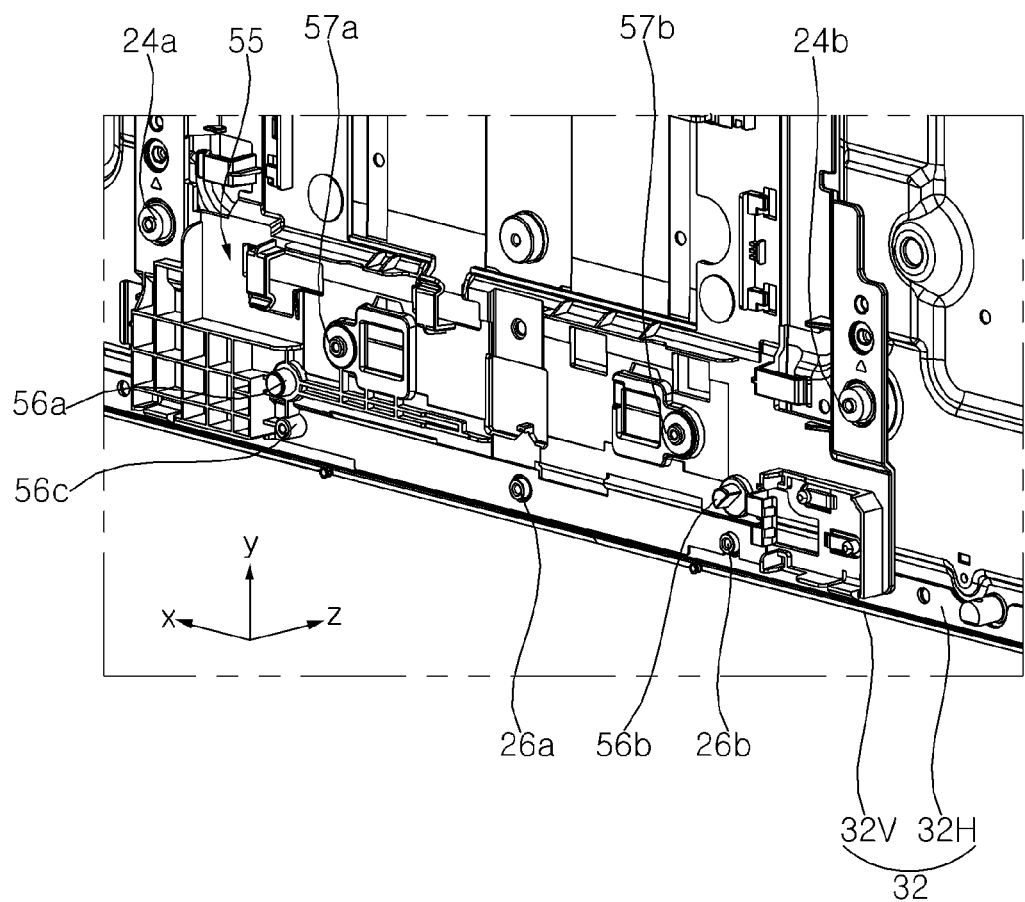

Referring to FIG. 8, a base 55 may be detachably coupled to the frame 20 and the second part 32 at the rear of the frame 20. The base 55 may be located in the upper side of the vertical portion 32V. A part of the base 55 may cover at least a part of the rear of the cable hole CH1, CH2 (see FIG. 7). A part of the base 55 may cover a part of the rear surface of the horizontal portion 32H. The lower fixing portion 26a, 26b and the upper fixing portion 24a, 24b may penetrate the base 55.

A boss 56a, 56b and a third lower fixing portion 56c may protrude rearward from the base 55. The third lower fixing portion 56c may be adjacent to the vertical portion 32V. The third lower fixing portion 56c may face the second lower fixing portion 26b with respect to the first lower fixing portion 26a. The first boss 56a is adjacent to the third lower fixing portion 56c while being spaced upwardly therefrom. The second boss 56b is adjacent to the second lower fixing portion 26b while being spaced upwardly therefrom. For example, the third lower fixing portion 56c may be a pemnut. Meanwhile, the boss 56a, 56b may be referred to as a fixing pin.

A first plate fixing portion 57a and a second plate fixing portion 57b may protrude rearward from the base 55. For example, the plate fixing portion 57a, 57b may be a pemnut.

Figure 9:
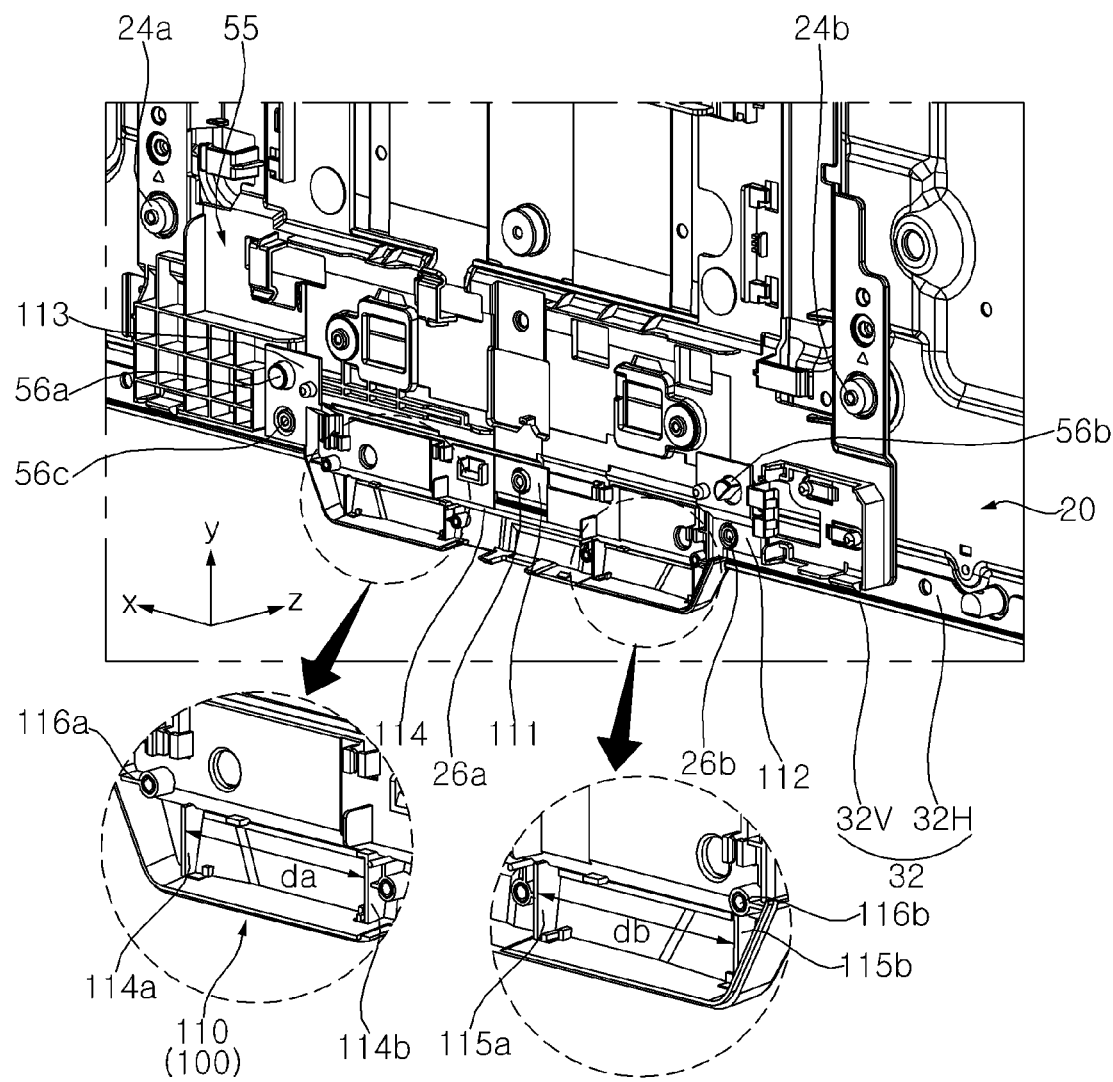

Referring to FIG. 9, a front housing 110 may be detachably coupled to the base 55 from the rear of the base 55. A first portion that is a part of the front housing 110 may be located in the upper side of the vertical portion 32V, and a second portion that is the remaining part of the front housing 110 may be located in the lower side of the vertical portion 32V. The second portion may protrude downward from the vertical portion 32V, and may form the front surface of the communication module 100. The first portion and the second portion may be formed as one body.

The first portion may include a first coupling portion 111, a second coupling portion 112, and a third coupling portion 113. The first coupling portion 111 may be located approximately in the center of the first portion, and the third coupling portion 113 may face the second coupling portion 112 with respect to the first coupling portion 111. The first lower fixing portion 26a may penetrate the first coupling portion 111. The second lower fixing portion 26b and the second boss 56b may penetrate the second coupling portion 112. The third lower fixing portion 56c and the first boss 56a may penetrate the third coupling portion 113.

The second portion may include a pair of left ribs 114a and 114b and a pair of right ribs 115a and 115b that are provided in the inner side of the second portion. The pair of left ribs 114a and 114b and the pair of right ribs 115a and 115b may be spaced apart from each other in the left-right direction, and may be vertically disposed in the inner side of the second portion. A partition wall 114 may be located in a boundary between the first portion and the second portion, and may extend in the left-right direction to be in contact with the inner side of the front housing 110 or be adjacent thereto. A pair of left ribs 114a and 114b and a pair of right ribs 115a and 115b may be coupled to the lower side of the partition wall 114. A first left rib 114a may be adjacent to the left side of the second portion, and the second left rib 114b is spaced rightwardly from the first left rib 114a by a first distance da. A first right rib 115a may face the first left rib 114a with respect to the second left rib 114b. A second right rib 115b may be rightwardly spaced apart from the first right rib 115a by a second distance db, and may be adjacent to the right side of the second portion.

For example, the first distance da may be substantially equal to the second distance db. As another example, the first distance da may be smaller or greater than the second distance db.

Meanwhile, the housing fixing portion 116a, 116b may protrude rearward from the inner side of the front housing 110, and may be spaced upwardly from the partition wall 114. The first housing fixing portion 116a may be adjacent to the left side of the front housing 110, and the second housing fixing portion 116b may be adjacent to the right side of the front housing 110. For example, the housing fixing portion 116a, 116b may be a pemnut.

Figure 10:
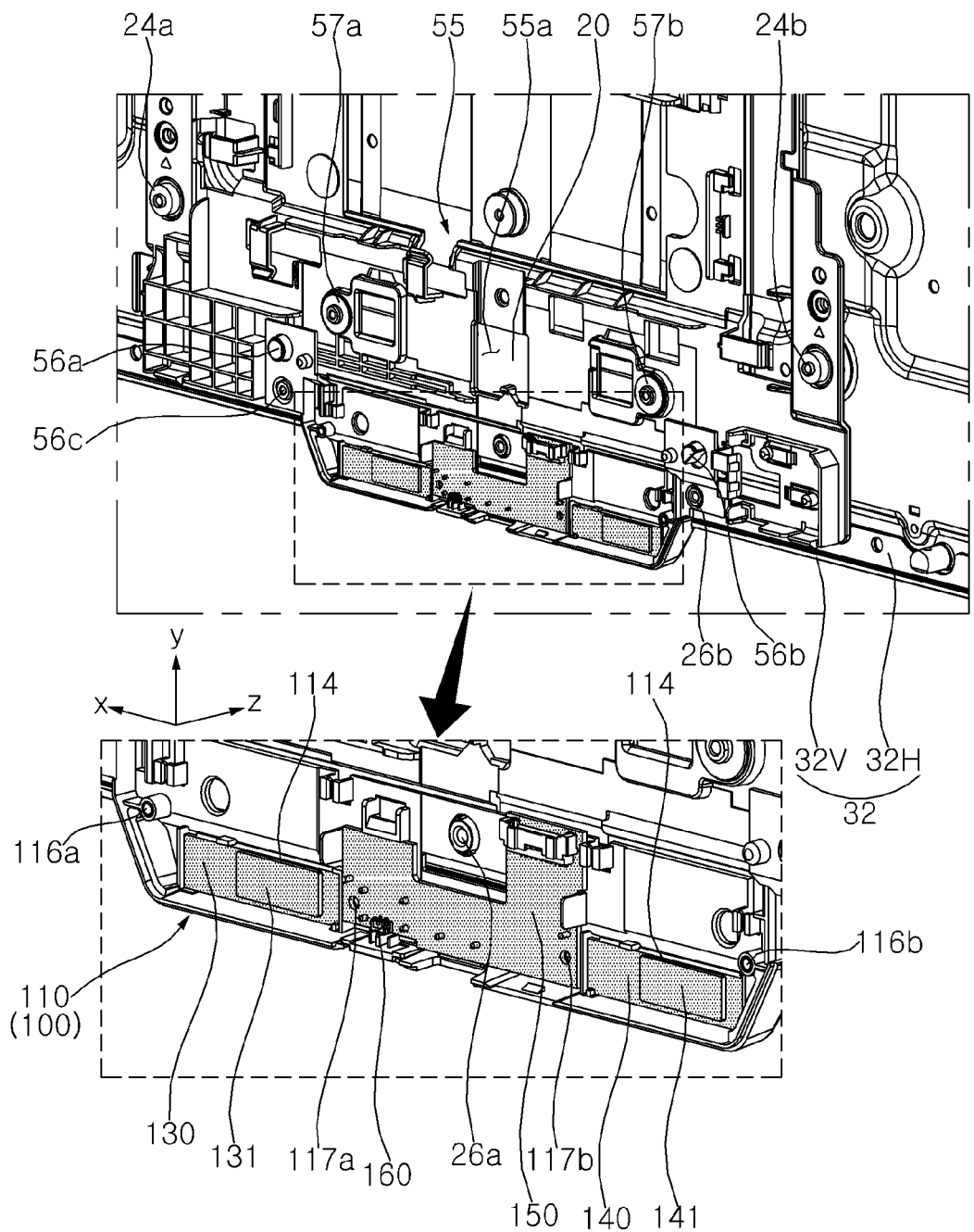

Referring to FIGS. 9 and 10, the communication module 100 may include an antenna unit 130, 140. The antenna unit 130, 140 may include a printed circuit board (PCB). The number of antenna unit 130, 140 may be one, or two or more. The first antenna unit 130 may be disposed between a pair of left ribs 114a and 114b. The first pad 131 may be coupled to or attached to the rear surface of the first antenna unit 130. The first pad 131 may include a material having excellent thermal conductivity, and may be referred to as a thermal pad. The second antenna unit 140 may be disposed between a pair of right ribs 115a and 115b. The second pad 141 may be coupled or attached to the rear surface of the second antenna unit 140. The second pad 141 may include a material having excellent thermal conductivity, and may be referred to as a thermal pad. Meanwhile, the first antenna unit 130 may be referred to as a left antenna unit, and the second antenna unit 140 may be referred to as a right antenna unit.

For example, the first antenna unit 130 and the second antenna unit 140 may have a different polarization characteristic. For example, the first antenna unit 130 may have a vertical polarization characteristic. For example, the second antenna unit 140 may have a horizontal polarization characteristic. Here, the polarization means a polarization direction of the electric field with respect to the traveling direction of the electromagnetic wave of the antenna.

An infrared (IR) module 150 may be disposed between the second left rib 114b and the first right rib 115a. The IR module 150 may include a controller. The IR module 150 may include a printed circuit board (PCB). An input unit 160 may be mounted in the lower side of the IR module 150. The input unit 160 may be exposed downwardly of the front housing 110. Meanwhile, the input unit 160 may be referred to as a power supply unit or a button.

Meanwhile, a board pin 117a, 117b may protrude rearward from the IR module 150. A first board pin 117a may be adjacent to the left side of the IR module 150, and the second board pin 117b may be adjacent to the right side of the IR module 150.

Figure 11:
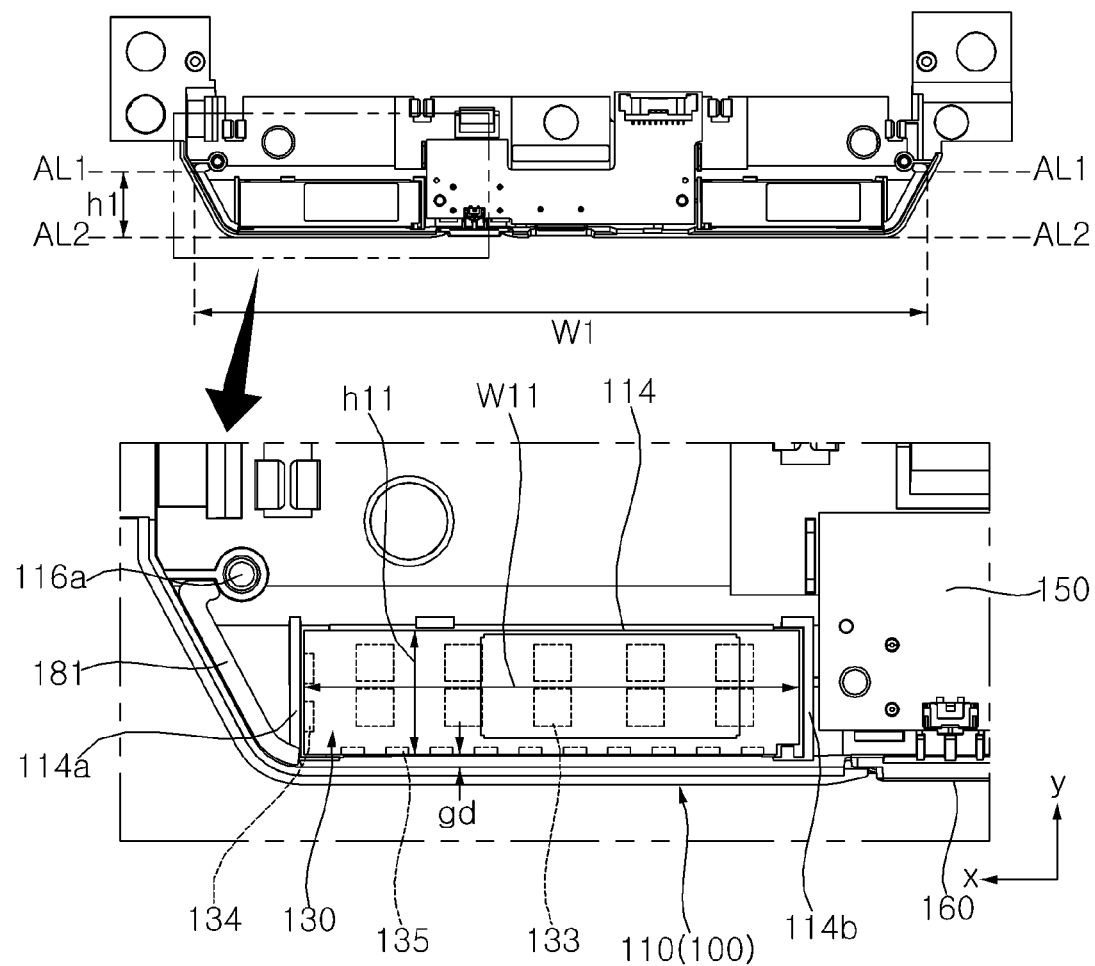

Referring to FIGS. 10 and 11, a first straight line AL1 may extend along the lower side of the vertical portion 32V. A second straight line AL2 may extend along the lower side of the front housing 110.

The height h1 of the front housing 110 at the outside of the vertical portion 32V may be a distance between the first straight line AL1 and the second straight line AL2 in the up-down direction. The height h1 may be referred to as a protrusion height or a protrusion amount.

The width w1 of the front housing 110 at the outside of the vertical portion 32V may be a maximum width of the front housing 110 in the left-right direction. The width w1 may be referred to as a protrusion width.

The height h1 may be smaller than the width w1. That is, the front housing 110 may extend from the outside of the vertical portion 32V in the left-right direction. For example, the height h1 may be smaller than half the width w1. For example, the height h1 may be smaller than about ⅛ of the width w1.

Figure 12:
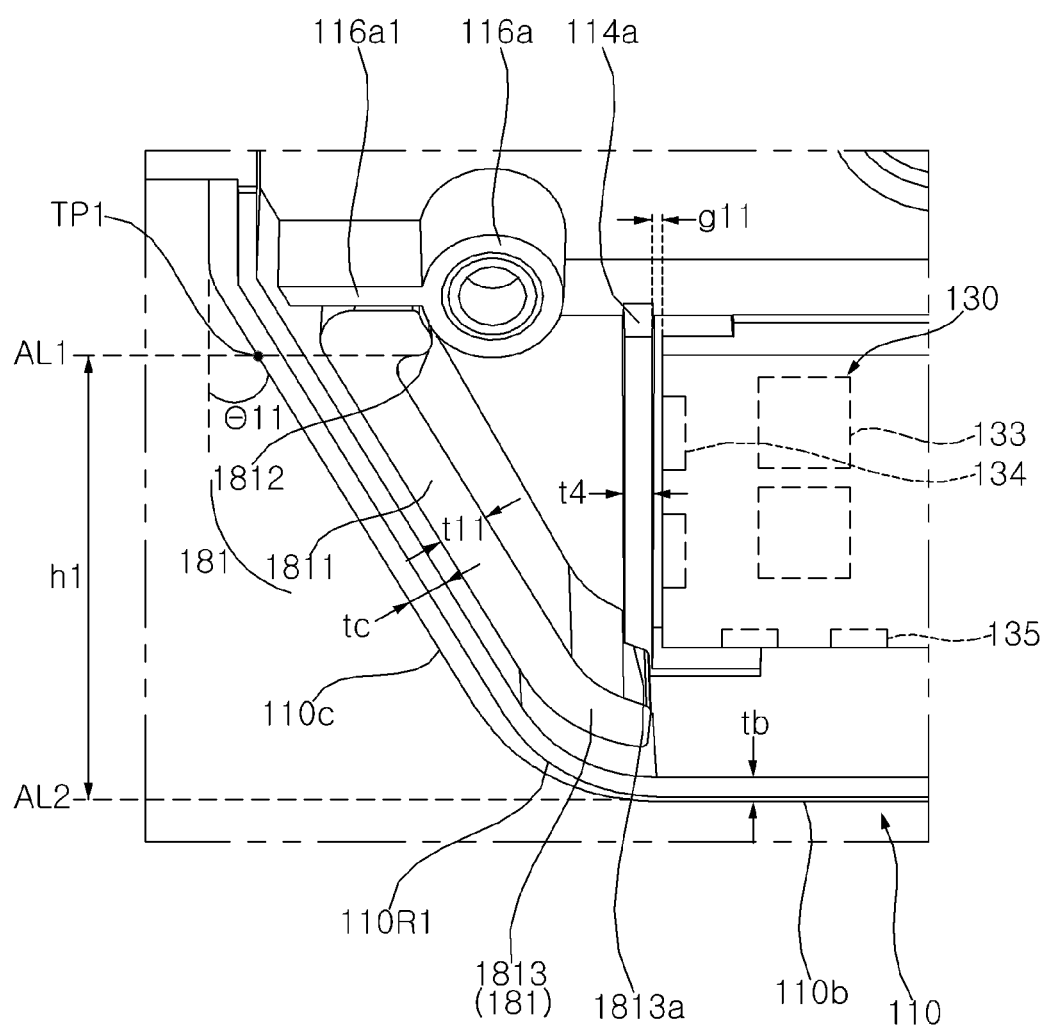

Referring to FIGS. 11 and 12, the first antenna unit 130 may be located between the first straight line AL1 and the second straight line AL2, and be disposed between the pair of left ribs 114a and 114b. The first antenna unit 130 may extend long in the left-right direction. The first width w11 which is the width of the first antenna unit 130 may be defined in the left-right direction, the first height h1l which is the height of the first antenna unit 130 may be defined in the up-down direction, and the thickness of the first antenna unit 130 may be defined in the front-rear direction.

The first height h11 may be smaller than the first width w11. For example, the first height h11 may be smaller than half of the first width w11. For example, the first height h11 may be smaller than about ¼ of the first width w11.

The plurality of first antennas 133, 134, and 135 may be located on the front and side surfaces of the first antenna unit 130. The plurality of first front antennas 133 may be mounted on the front surface of the first antenna unit 130. The plurality of first left antennas 134 may be mounted on the left surface of the first antenna unit 130. The plurality of first lower antennas 135 may be mounted on the lower surface of the first antenna unit 130. In addition, the plurality of first right antennas (not shown) may be mounted on the right surface of the first antenna unit 130. However, the plurality of first right antennas may be omitted.

Figure 19:
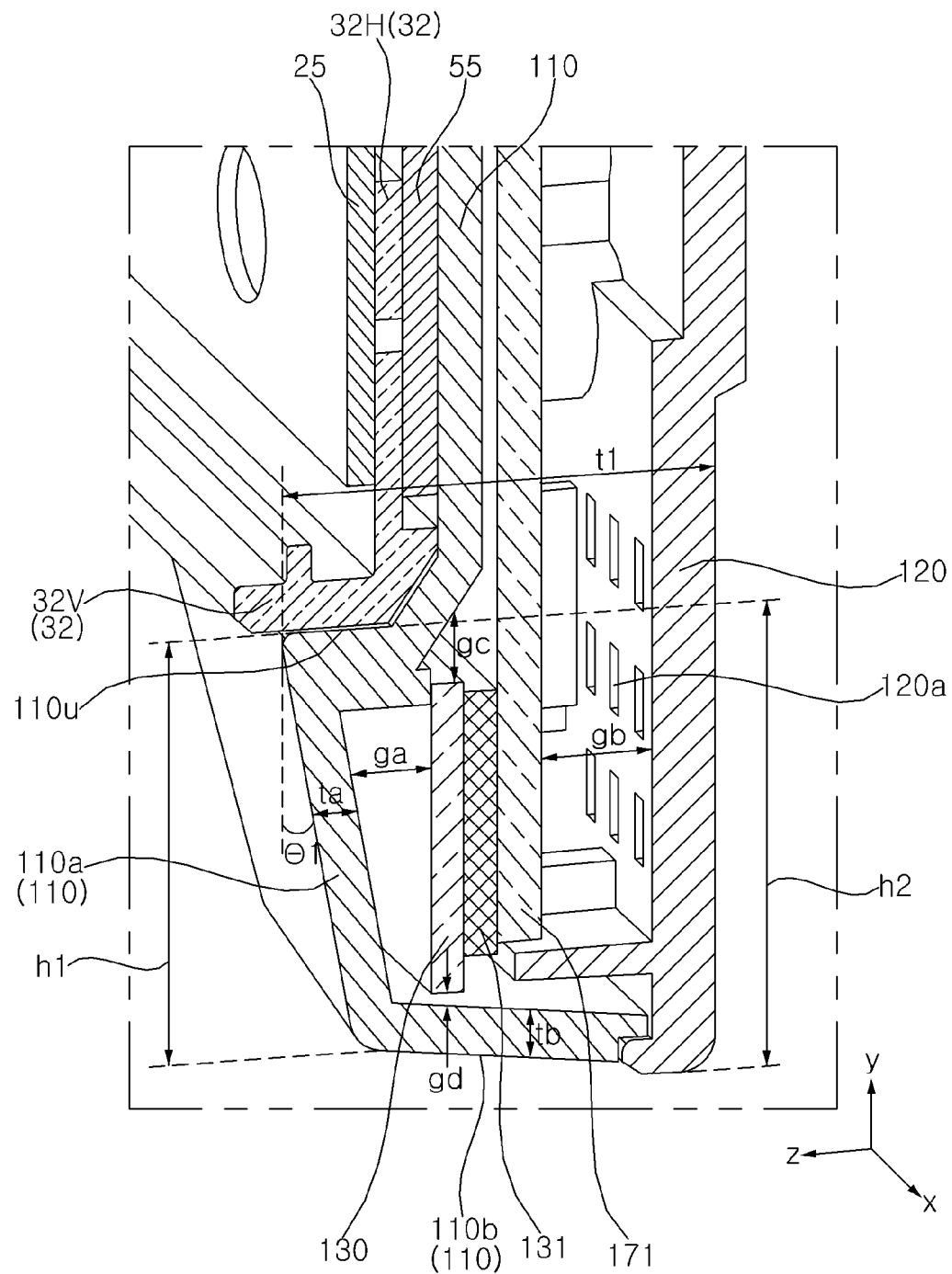

The plurality of first front antennas 133 may be rearwardly spaced apart from a front portion 110a of the front housing 110 (see FIG. 19 ga). The plurality of first left antennas 134 may be spaced apart from the first left rib 114a to the right (see g11). The plurality of first right antennas may be spaced apart from the second left rib 114b to the left. The plurality of first lower antennas 135 may be upwardly spaced apart from the lower portion 110b of the front housing 110 (see gd).

For example, the plurality of first front antennas 133 may be a patch antenna. For example, the plurality of first left antennas 134, the plurality of first lower antennas 135, and the plurality of first right antennas may be an array antenna that uses a dipole antenna or a monopole antenna.

Figure 13:
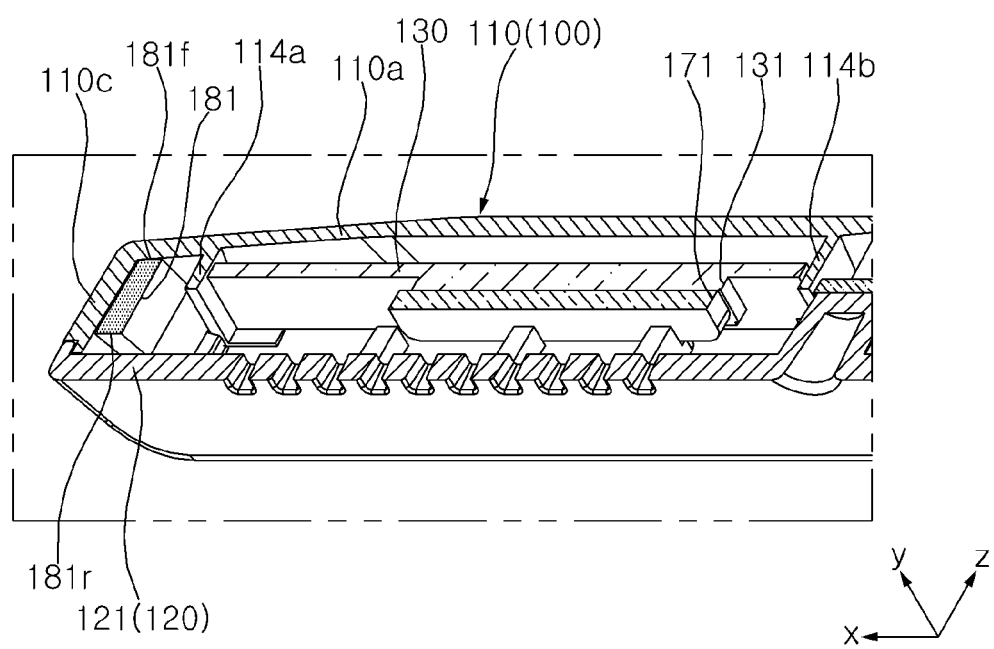

Referring to FIGS. 12 and 13, the number of first left antennas 134 may be smaller than the number of first front antennas 133 and/or the number of first lower antennas 135.

The first left antennas 134 may face a left portion 110c of the front housing 110 with respect to the first left rib 114a.

For example, the left portion 110c may be disposed parallel to a vertical line. As another example, the left portion 110c may form an acute angle theta 11 to the right or left with respect to the vertical line.

A first side member 181 may be disposed between the left portion 110c and the first left rib 114a. A front end 181f of the first side member 181 may contact the inner side of the front portion 110a of the front housing 110. A rear end 181r of the first side member 181 may be spaced apart from the inner side of a first housing 121 of a rear housing 120 described later. The first left rib 114a may protrude from the front portion 110a toward the first housing 121, and a distal end of the first left rib 114a may be disposed closer to the front end 181f than the rear end 181r of the first side member 181. The first antenna unit 130 may be disposed closer to the front end 181f than the rear end 181r of the first side member 181.

The first side member 181 may include a first body 1811, a first bending portion 1812, and a first round portion 1813. The first side member 181 may be referred to as a first dummy or a first injection molding.

The first body 1811 may extend along the left portion 110c and may come into contact with the inner side of the left portion 110c. The first body 1811 may face the first left antennas 134 with respect to the first left rib 114a. In other words, in the left-right direction, the first left antennas 134 may overlap the first body 1811. For example, the thickness t11 of the first body 1811 may be substantially the same as the thickness tc of the left portion 110c. As another example, the thickness t11 of the first body 1811 may be greater or smaller than the thickness tc of the left portion 110c. In addition, the first left rib 114a, the first side member 181, and the left portion 110c may include a resin or polycarbonate (PC) material.

Accordingly, the beam pattern of the plurality of first left antennas 134 may be formed toward the left of the communication module 100 while being biased in a forward direction of the communication module 100 than in a rearward direction of the communication module 100.

The first bending portion 1812 may be bent toward the first left rib 114a from the upper end of the first body 1811. A distal end of the first bending portion 1812 may contact the first housing fixing portion 116a. The first fixing portion 116a1 may extend from the inner side of the left portion 110c toward the first housing fixing portion 116a, and may be located in the first bending portion 1812. Meanwhile, the first straight line AL1 may be located at a boundary between the upper end of the first body 1811 and the first bending portion 1812. In other words, in the left-right direction, the first left antennas 134 may not overlap the first bending portion 1812.

The first round portion 1813 may be formed to be rounded at the lower end of the first body 1811. A left corner 110R1 where the left portion 110c and the lower portion 110b meet may be rounded. The first round portion 1813 may extend along the left corner 110R1, and may contact the left corner 110R1. A first groove 1813a may be formed in the front end of the first round portion 1813, and the lower end of the first left rib 114a may be inserted therein.

Accordingly, the first side member 181 may be detachably coupled to the inner side of the front housing 110.

Figure 14:
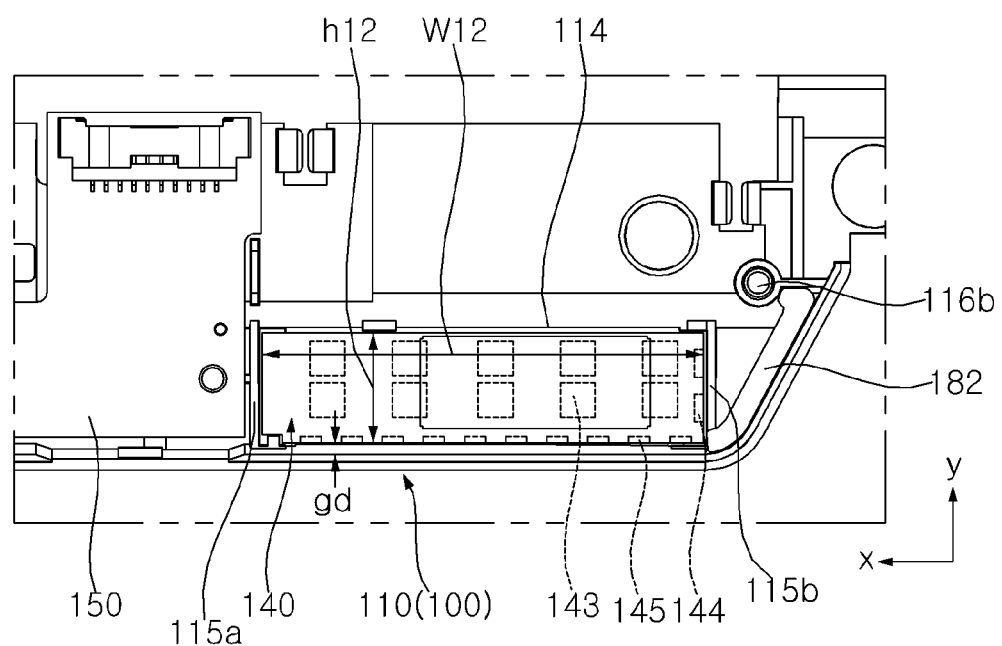
Figure 15:
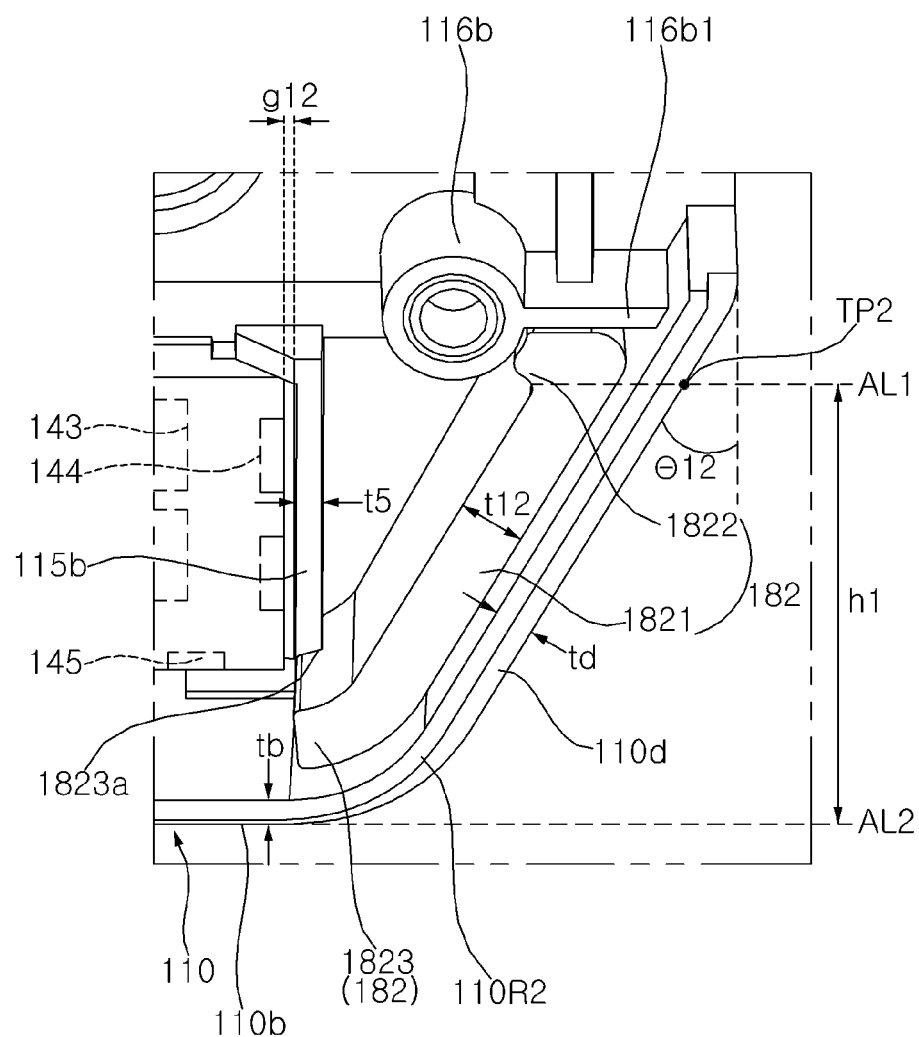

Referring to FIGS. 14 and 15, the second antenna unit 140 may be located between the first straight line AL1 and the second straight line AL2, and be disposed between the pair of right ribs 115a and 115b. The second antenna unit 140 may extend long in the left-right direction. The second width w12 which is the width of the second antenna unit 140 may be defined in the left-right direction, the second height h12 which is the height of the second antenna unit 140 may be defined in the up-down direction, and the thickness of the second antenna unit 140 may be defined in the front-rear direction.

The second height h12 may be smaller than the second width w12. For example, the second height h12 may be smaller than half of the second width w12. For example, the second height h12 may be smaller than about ¼ of the second width w12.

The plurality of second antennas 143, 144, and 145 may be located in the front and side surfaces of the second antenna unit 140. The plurality of second front antennas 143 may be mounted in the front surface of the second antenna unit 140. The plurality of second right antennas 144 may be mounted in the right surface of the second antenna unit 140. The plurality of second lower antennas 145 may be mounted in the lower surface of the second antenna unit 140. In addition, a plurality of second left antennas (not shown) may be mounted in the left surface of the second antenna unit 140. However, the plurality of second left antennas may be omitted.

Figure 20:
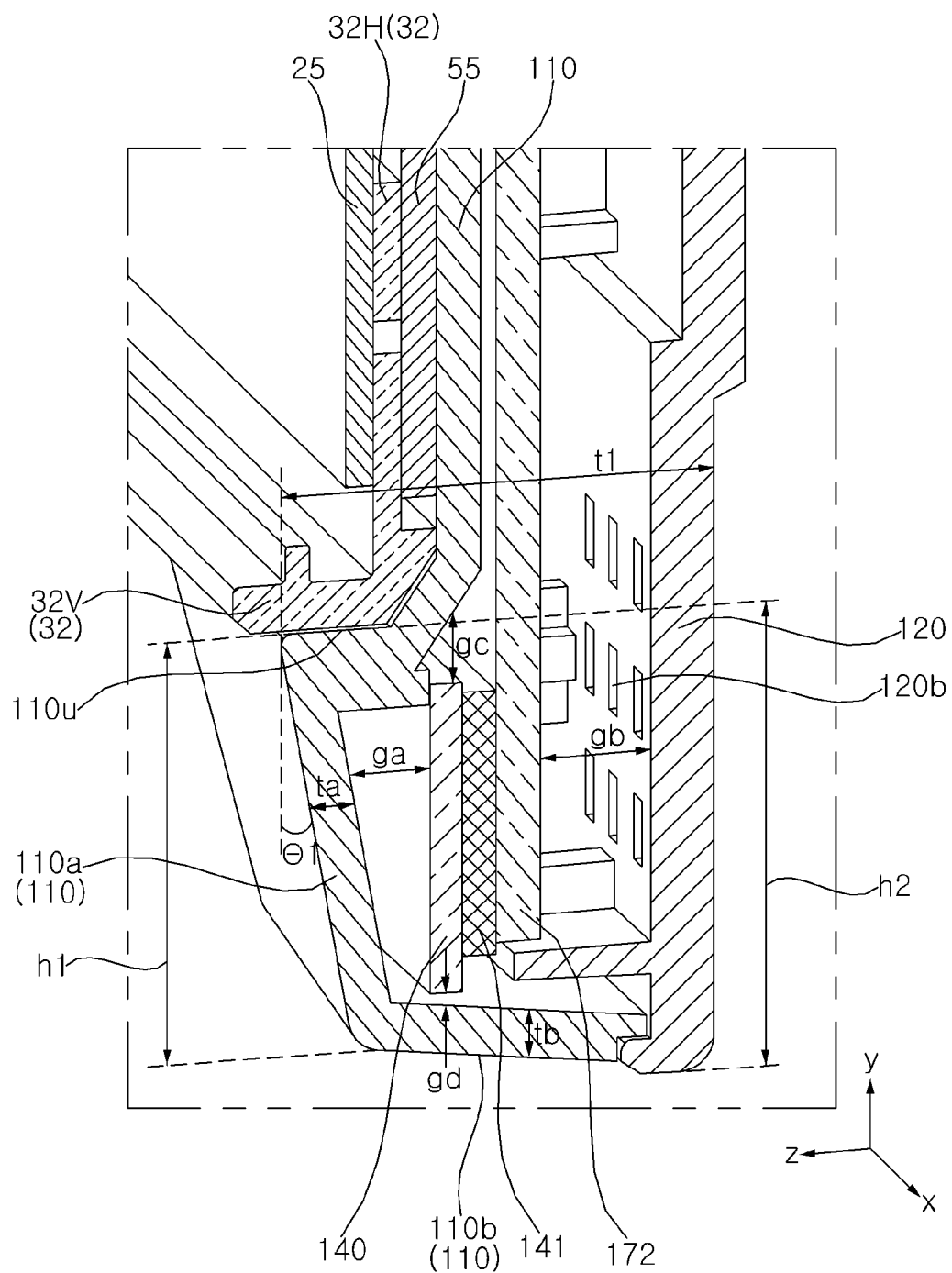

The plurality of second front antennas 143 may be rearwardly spaced apart from the front portion 110a of the front housing 110 (see FIG. 20 ga). The plurality of second right antennas 144 may be spaced apart from the second right rib 115b to the left (see g12). The plurality of second left antennas may be spaced apart from the first right rib 115a to the right. The plurality of second lower antennas 145 may be upwardly spaced apart from the lower portion 110b of the front housing 110 (see gd).

For example, the plurality of second front antennas 143 may be a patch antenna. For example, the plurality of second right antennas 144, the plurality of second lower antennas 145, and the plurality of second left antennas may be an array antenna that uses a dipole antenna or a monopole antenna.

Figure 16:
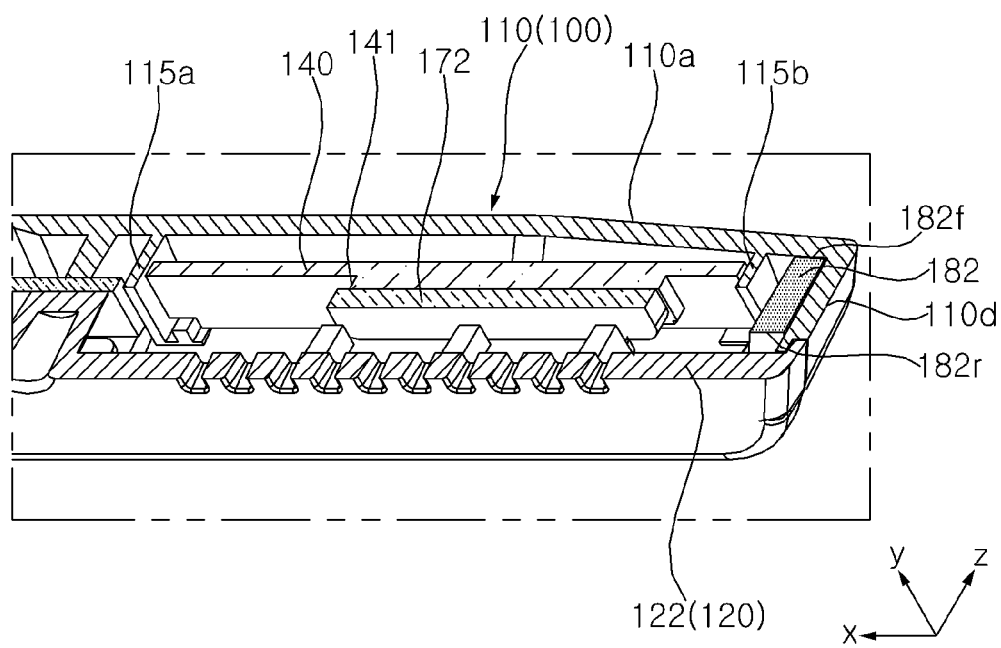

Referring to FIGS. 15 and 16, the number of second right antennas 144 may be smaller than the number of second front antennas 143 and/or the number of second lower antennas 145. The second right antennas 144 may face the right portion 110d of the front housing 110 with respect to the second right rib 115b.

For example, the right portion 110d may be disposed parallel to a vertical line. As another example, the right portion 110d may form an acute angle theta 12 to the left or right with respect to the vertical line.

A second side member 182 may be disposed between the right portion 110d and the second right rib 115b. The front end 182f of the second side member 182 may contact the inner side of the front portion 110a of the front housing 110. The rear end 182r of the second side member 182 may be spaced apart from the inner side of the second housing 122 of the rear housing 120 described later. The second right rib 115b may protrude from the front portion 110a toward the second housing 122, and the distal end of the second right rib 115b may be disposed closer to the front end 182f of the second side member 182 greater than the rear end 182r of the second side member 182. The second antenna unit 140 may be disposed closer to the front end 182f of the second side member 182 than the rear end 182r of the second side member 182.

The second side member 182 may include a second body 1821, a second bending portion 1822, and a second round portion 1823. The second side member 182 may be referred to as a second dummy or a second injection molding.

The second body 1821 may extend along the right portion 110*d* and may come into contact with the inner side of the right portion 110*d*. The second body 1821 may face the second right antennas 144 with respect to the second right rib 115*b*. In other words, in the left-right direction, the second right antennas 144 may overlap the second body 1821. For example, the thickness t12 of the second body 1821 may be substantially the same as the thickness td of the right portion 110*d*. As another example, the thickness t12 of the second body 1821 may be greater or smaller than the thickness td of the right portion 110*d*. In addition, the second right rib 115*b*, the second side member 182, and the right portion 110*d* may include a resin or polycarbonate (PC) material.

Accordingly, the beam pattern of the plurality of second right antennas 144 may be formed toward the right side of the communication module 100 while being biased in a forward direction of the communication module 100 than in a rearward direction.

The second bending portion 1822 may be bent toward the second right rib 115*b* from the upper end of the second body 1821. A distal end of the second bending portion 1822 may contact the second housing fixing portion 116*b*. The second fixing portion 116*b*1 may extend from the inner side of the right portion 110*d* toward the second housing fixing portion 116*b*, and may be located in the second bending portion 1822. Meanwhile, the first straight line AL1 may be located at the boundary between the upper end of the second body 1821 and the second bending portion 1822. In other words, in the left-right direction, the second right antennas 144 may not overlap the second bending portion 1822.

The second round portion 1823 may be formed to be rounded at the lower end of the second body 1821. A right corner 110R2 where the right portion 110*d* and the lower portion 110*b* meet may be rounded. The second round portion 1823 may extend along the right corner 110R2 and may contact the right corner 110R2. A second groove 1823*a* may be formed at the front end of the second round portion 1823, and the lower end of the second right rib 115*b* may be inserted therein.

Accordingly, the second side member 182 may be detachably coupled to the inner side of the front housing 110.

Figure 17:
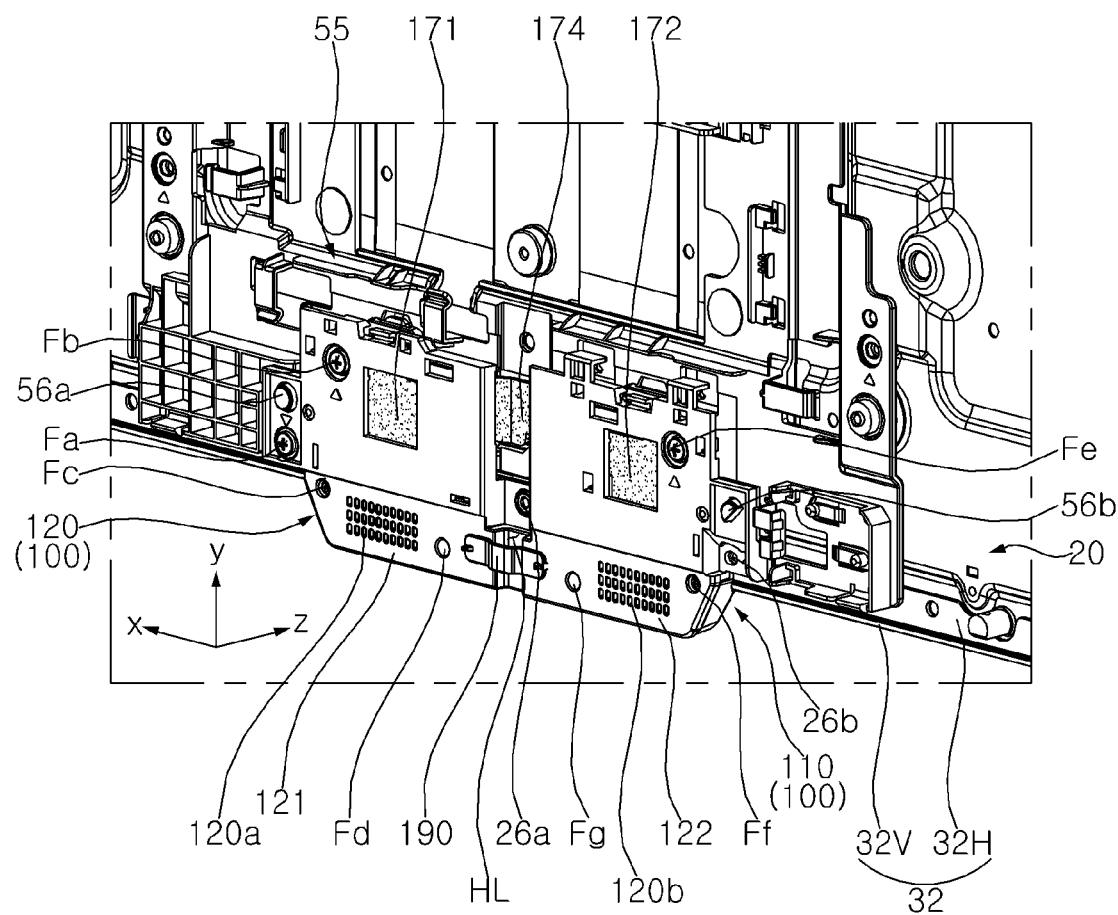

Referring to FIGS. 10 and 17, the rear housing 120 may be detachably coupled to the base 55 and the front housing 110 in a rearward direction of the front housing 110. The rear housing 120 may form a rear surface of the communication module 100. The rear housing 120 may include a first housing 121 and a second housing 122. The first housing 121 may be located in a rearward direction of the first antenna unit 130. The second housing 122 may be located in a rearward direction of the second antenna unit 140. The first housing 121 and the second housing 122 may be formed as one body.

In addition, the first boss 56*a* may penetrate the first housing 121, and the second boss 56*b* may penetrate the second housing 122. Accordingly, the first boss 56*a* and the second boss 56*b* may guide the coupling of the rear housing 120 with respect to the base 55 and the front housing 110.

In addition, a fastening member (not shown) may be fastened to the first lower fixing portion 26*a* between the first housing 121 and the second housing 122. The first fastening member Fa may penetrate the first housing 121, and may be fastened to the third lower fixing portion 56*c*. The second fastening member Fb may penetrate the first housing 121 and may be fastened to the first plate fixing portion 57*a*. The third fastening member Fc may penetrate the first housing 121, and be fastened to the first housing fixing portion 116*a*. A fourth fastening member Fd may penetrate the first housing 121 and the first board pin 117*a* and may be fastened to the inner side of the front housing 110. A fifth fastening member (not shown) may penetrate the second housing 122, and may be fastened to the second lower fixing portion 26*b*. A sixth fastening member Fe may penetrate the second housing 122, and be fastened to the second plate fixing portion 57*b*. A seventh fastening member Ff may penetrate the second housing 122, and may be fastened to the second housing fixing portion 116*b*. An eighth fastening member Fg may penetrate the second housing 122 and the second board pin 117*b*, and may be fastened to the inner side of the front housing 110.

Accordingly, the communication module 100 may be coupled to the frame 20, the compression portion 25 (see FIG. 7), the second part 32, and the base 55, and the rigidity of the communication module 100 can be increased. For example, the communication module 100 may be left-right symmetrical with respect to a virtual reference line extending vertically through the center of the communication module 100.

Meanwhile, the fastening members may be a screw. In addition, the fastening members may be spaced apart from the antenna unit 130, 140 by a certain distance or more. The fastening members may not overlap the antenna unit 130, 140 in the front-rear direction. Accordingly, it is possible to minimize beam distortion and performance degradation of the antenna unit 130, 140 caused by the fastening members.

Figure 18:
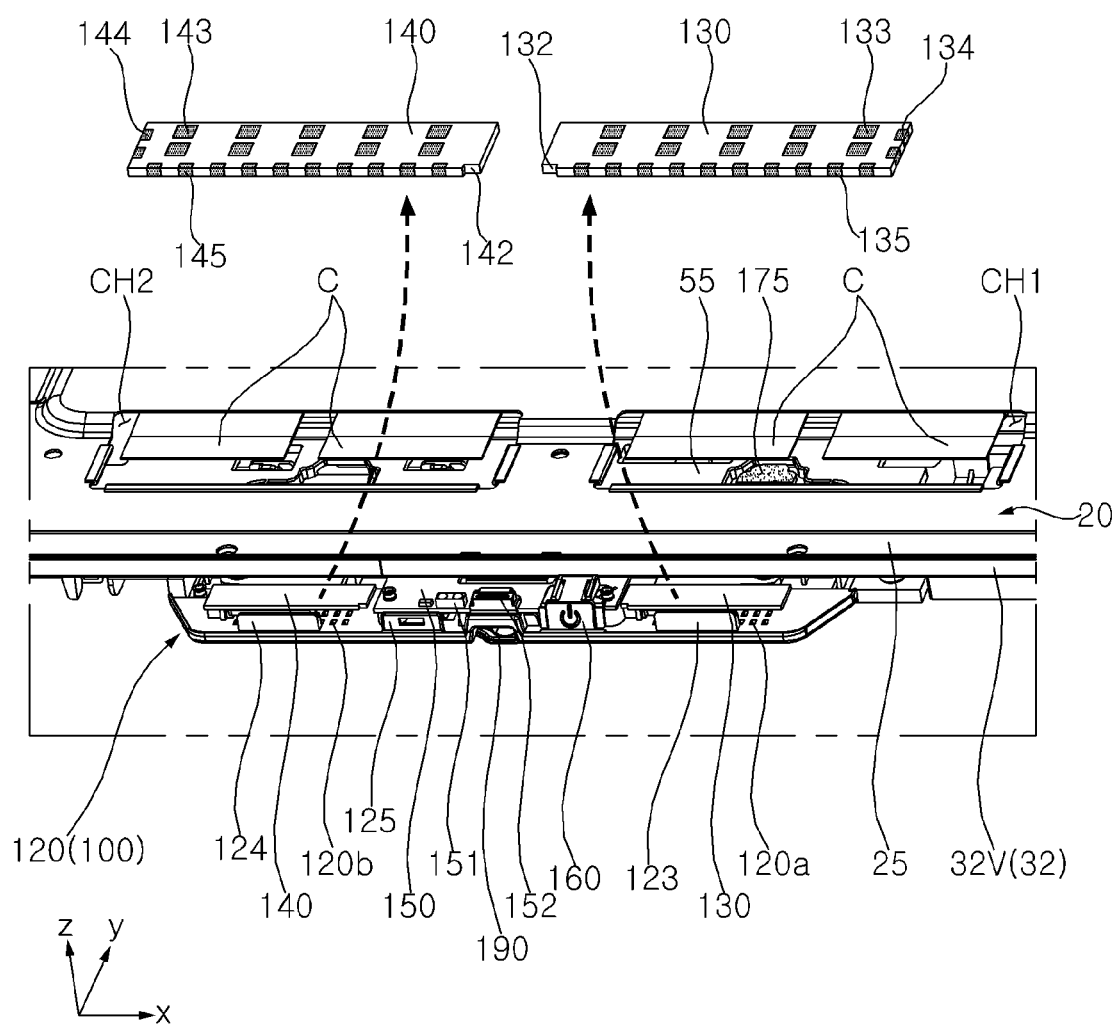

Referring to FIGS. 10 and 18, a first cut-out 132 may be formed at a corner where the lower side and the right side of the first antenna unit 130 meet. A second cut-out 142 may be formed at a corner where the lower side and the left side of the second antenna unit 140 meet. Accordingly, a user can easily identify the installation location of the first antenna unit 130 and the second antenna unit 140 for the inside of the communication module 100 through the positions of the first cut-out 132 and the second cut-out 142.

A first seating portion 123 may be provided in the inner side of the rear housing 120, and a first pad 131 (see FIG. 10) may be seated on the first seating portion 123. A second seating portion 124 may be provided in the inner side of the rear housing 120, and a second pad 141 (see FIG. 10) may be seated on the second seating portion 124. Accordingly, the first antenna unit 130 and the second antenna unit 140 may be spaced apart from the lower end of the rear housing 120 upward.

A third seating portion 125 may be provided in the inner side of the rear housing 120, and the IR module 150 may be mounted on the third seating portion 125. The IR unit 151 may be provided in the front surface of the IR module 150. An indicator 152 may be provided in the front surface of the IR module 150, and may be adjacent to the IR unit 151. The front housing 110 may include a translucent material.

Referring to FIGS. 19 and 20, a contact portion 110*u* of the front housing 110 may contact the lower side of the vertical portion 32V, and may be spaced apart from the front end of the vertical portion 32V rearward. The front portion 110*a* of the front housing 110 may be inclined rearward with respect to the contact portion 110*u* (see theta 1). Meanwhile, in the up-down direction, a distance h2 between the contact portion 110*u* and the lower end of the rear housing 120 may be greater than a distance h1 between the contact portion 110*u* and the lower portion 110*b* of the front housing 110. Meanwhile, in the front-rear direction, the thickness t1 of the communication module 100 may be a distance between the front end of the contact portion 110*u* and the rear surface of the rear housing 120.

The first antenna unit 130 and the second antenna unit 140 may be spaced apart from the inner side of the front housing 110 and the inner side of the rear housing 120.

In the front-rear direction, the front surface of the first antenna unit 130 and the front surface of the second antenna unit 140 may be spaced apart from the front housing 110 by a first gap ga. In the up-down direction, the upper end of the first antenna unit 130 and the upper end of the second antenna unit 140 may be spaced apart from the front housing 110 by a third gap gc. In the up-down direction, the lower end of the first antenna unit 130 and the lower end of the second antenna unit 140 may be spaced apart from the front housing 110 by a fourth gap gd. In addition, the first antenna unit 130 and the second antenna unit 140 may be disposed closer to the inner side of the front housing 110 than the inner side of the rear housing 120.

For example, the first gap ga may be 1 to 4.5 mm, and the fourth gap gd may be 1 mm or less. For example, the third gap gc may be greater than the fourth gap gd.

For example, the thickness to of the front portion 110*a* of the front housing 110, the thickness tb of the lower portion 110*b*, the thickness of the left portion, and the thickness of the right portion may be 1 to 1.5 mm to substantially be the same. For example, the front housing 110 may include a resin material. For example, the front housing 110 may include a polycarbonate (PC) material.

Accordingly, it is possible to minimize beam distortion and performance degradation of the first antenna unit 130 and the second antenna unit 140 caused by the front housing 110.

The thickness of the rear housing 120 may be 1 to 1.5 mm. For example, the rear housing 120 may include resin. For example, the rear housing 120 may include PC ABS.

Accordingly, it is possible to minimize beam distortion and performance degradation of the first antenna unit 130 and the second antenna unit 140 caused by the rear housing 120.

Referring to FIGS. 1 to 20, a display device may include: a display panel; a frame positioned behind the display panel, and to which the display panel is coupled; and a communication module which protrudes from one side of the frame to an outside of the frame, and extends long along the one side of the frame, wherein the communication module includes: an antenna unit; a housing which provides an internal space in which the antenna unit is positioned; and a side member which is positioned between a side surface of the antenna unit and an inner side of the housing, in a length direction of the communication module.

A height of the housing at the outside of the frame may be smaller than a width of the housing at the outside of the frame.

A height of the antenna unit may be smaller than a width of the antenna unit.

The communication module may include: a plurality of front antennas provided on a front surface of the antenna unit; and a plurality of side antennas provided on the side surface of the antenna unit, wherein the number of side antennas may be smaller than the number of the front antennas.

The antenna unit may include: a first antenna unit; and a second antenna unit which is spaced apart from the first antenna unit, in the length direction of the communication module, wherein the first antenna unit and the second antenna unit may have a different polarization characteristic.

The communication module may further include an IR module which is positioned in the internal space of the housing, and disposed between the first antenna unit and the second antenna unit.

The first antenna unit may be adjacent to a left portion of the housing, may have a first width defined in a left-right direction, and may have a first height which is defined in an up-down direction and smaller than the first width, wherein the first antenna unit may include: a plurality of first front antennas provided on a front surface of the first antenna unit; and a plurality of first left antennas provided on a left surface of the first antenna unit, wherein the side member may include a first side member disposed between the plurality of first left antennas and the left portion of the housing.

The first antenna unit may be disposed closer to a front portion of the housing than a rear portion of the housing.

The first side member may be in contact with an inner side of front portion of the housing, and may be spaced apart from an inner side of rear portion of the housing, wherein the first antenna unit may be disposed closer to a front end than a rear end of the first side member.

The first side member may include a first body which extends along the left portion of the housing, and is in contact with the inner side of the left portion, wherein the plurality of first left antennas may overlap with the first body, in a left-right direction.

The first side member may further include: a first bending portion bent toward the first antenna unit from an upper end of the first body; and a first round portion which is formed to be rounded at a lower end of the first body, and has a groove formed at a front end, wherein the housing may include: a fixing portion which protrudes from the left portion of the housing to the internal space of the housing, and is located in the first bending portion; and a left rib which is formed in an inner side the housing, adjacent to the left surface of the first antenna unit, and partially inserted into the groove.

The first antenna unit may further include: a plurality of first lower antennas provided on a lower surface of the first antenna unit; and a plurality of first right antennas provided on a right surface of the first antenna unit, wherein the housing may include: a first left rib which is adjacent to the left surface of the first antenna unit and spaced apart from the plurality of first left antennas; and a second left rib which is adjacent to the right surface of the first antenna unit and spaced apart from the plurality of first right antennas.

The inner side of the housing may be spaced apart from the plurality of first front antennas, the plurality of first left antennas, the plurality of first right antennas, and the plurality of first lower antennas.

The front portion and the left portion of the housing may have substantially the same thickness.

The housing and the first side member may include a resin or PC material.

The effect of the display device according to the present disclosure is described as follows.

According to at least one of the embodiments of the present disclosure, it is possible to provide a display device having a wireless communication module.

According to at least one of the embodiments of the present disclosure, it is possible to provide a structure for improving the transmission/reception rate of the antenna of the communication module.

According to at least one of the embodiments of the present disclosure, it is possible to provide a structure in which a beam pattern of a side antenna of the communication module is formed to be biased in a forward direction than in a rearward direction of the communication module.

According to at least one of the embodiments of the present disclosure, it is possible to provide a coupling structure of communication module with respect to a display device.

According to at least one of the embodiments of the present disclosure, it is possible to provide a coupling structure of an antenna unit with respect to the communication module.

Certain embodiments or other embodiments of the disclosure described above are not mutually exclusive or distinct from each other. Any or all elements of the embodiments of the disclosure described above may be combined or combined with each other in configuration or function.

For example, a configuration "A" described in one embodiment of the disclosure and the drawings and a configuration "B" described in another embodiment of the disclosure and the drawings may be combined with each other. Namely, although the combination between the configurations is not directly described, the combination is possible except in the case where it is described that the combination is impossible.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A display device comprising:
   a display panel;
   a frame positioned behind the display panel, and to which the display panel is coupled; and
   a communication module which protrudes from one side of the frame to an outside of the frame, and extends along the one side of the frame,
   wherein the communication module comprises:
   an antenna unit;
   a housing which provides an internal space in which the antenna unit is positioned;
   a plurality of front antennas provided on a front surface of the antenna unit; and
   a plurality of side antennas provided on a side surface of the antenna unit,
   wherein a height of the housing at the outside of the frame is smaller than a width of the housing at the outside of the frame,
   wherein a height of the antenna unit is smaller than a width of the antenna unit, and
   wherein a number of the plurality of side antennas is less than a number of the plurality of front antennas.

2. The display device of claim 1, wherein the antenna unit comprises:
   a first antenna unit; and
   a second antenna unit which is spaced apart from the first antenna unit, in a length direction of the communication module,
   wherein the first antenna unit and the second antenna unit have a different polarization characteristic.

3. The display device of claim 2, wherein the communication module further comprises an IR module which is positioned in the internal space of the housing, and disposed between the first antenna unit and the second antenna unit.

4. The display device of claim 2, further comprising a first side member which is positioned between a side surface of the antenna unit and an inner side of the housing,
   wherein the first antenna unit is adjacent to a left portion of the housing, has a first width defined in a left-right direction, and has a first height which is defined in an up-down direction and smaller than the first width,
   wherein the first antenna unit comprises:
   a plurality of first front antennas provided on a front surface of the first antenna unit; and
   a plurality of first left antennas provided on a left surface of the first antenna unit, and
   wherein the first side member is disposed between the plurality of first left antennas and the left portion of the housing.

5. The display device of claim 4, wherein the first antenna unit is disposed closer to a front portion of the housing than a rear portion of the housing.

6. The display device of claim 4, wherein the first side member is in contact with an inner side of a front portion of the housing, and spaced apart from an inner side of rear portion of the housing,
   wherein the first antenna unit is disposed closer to a lower end than an upper end of the first side member.

7. The display device of claim 6, wherein the first side member comprises a first body which extends along the left portion of the housing, and is in contact with the inner side of the left portion,
   wherein the plurality of first left antennas overlap with the first body, in a left-right direction.

8. The display device of claim 7, wherein the first side member further comprises:
   a first bending portion bent toward the first antenna unit from an upper end of the first body; and
   a first round portion which is formed to be rounded at a lower end of the first body, and has a groove formed at an end thereof,
   wherein the housing comprises:
   a fixing portion which protrudes from the left portion of the housing to the internal space of the housing, and is located adjacent to the first bending portion; and
   a left rib which is formed in an inner side the housing, adjacent to the left surface of the first antenna unit, and partially inserted into the groove.

9. The display device of claim 4, wherein the first antenna unit further comprises:
   a plurality of first lower antennas provided on a lower surface of the first antenna unit; and
   a plurality of first right antennas provided on a right surface of the first antenna unit,
   wherein the housing comprises:
   a first left rib which is adjacent to the left surface of the first antenna unit and spaced apart from the plurality of first left antennas; and
   a second left rib which is adjacent to the right surface of the first antenna unit and spaced apart from the plurality of first right antennas.

10. The display device of claim 9, wherein the inner side of the housing is spaced apart from the plurality of first front antennas, the plurality of first left antennas, the plurality of first right antennas, and the plurality of first lower antennas.

11. The display device of claim 9, wherein a front portion and the left portion of the housing have substantially the same thickness.

12. The display device of claim 9, wherein the housing and the first side member comprise a resin or PC material.

13. The display device of claim 1, further comprising a side member which is positioned between a side surface of the antenna unit and an inner side of the housing.

14. A display device comprising:
a display panel;
a frame positioned behind the display panel, and to which the display panel is coupled; and
a communication module which protrudes from one side of the frame to an outside of the frame, and extends along the one side of the frame,
wherein the communication module comprises:
an antenna unit;
a housing which provides an internal space in which the antenna unit is positioned;
a plurality of front antennas provided on a front surface of the antenna unit; and
a plurality of side antennas provided on a side surface of the antenna unit,
wherein a number of the plurality of side antennas is less than a number of the plurality of front antennas.

15. The display device of claim 14, further comprising a side member which is positioned between a side surface of the antenna unit and an inner side of the housing.

16. The display device of claim 14, wherein the antenna unit comprises:
a first antenna unit; and
a second antenna unit which is spaced apart from the first antenna unit, in a length direction of the communication module,
wherein the first antenna unit and the second antenna unit have a different polarization characteristic.

17. The display device of claim 16, further comprising a first side member which is positioned between a side surface of the antenna unit and an inner side of the housing,
wherein the first antenna unit is adjacent to a left portion of the housing, has a first width defined in a left-right direction, and has a first height which is defined in an up-down direction and smaller than the first width,
wherein the first antenna unit comprises:
a plurality of first front antennas provided on a front surface of the first antenna unit; and
a plurality of first left antennas provided on a left surface of the first antenna unit, and
wherein the first side member is disposed between the plurality of first left antennas and the left portion of the housing.

18. The display device of claim 17, wherein the first side member is in contact with an inner side of front portion of the housing, and spaced apart from an inner side of rear portion of the housing, wherein the first antenna unit is disposed closer to a lower end than an upper end of the first side member.

19. The display device of claim 18, wherein the first side member comprises a first body which extends along the left portion of the housing, and is in contact with the inner side of the left portion,
wherein the plurality of first left antennas overlap with the first body, in a left-right direction.

20. The display device of claim 19, wherein the first side member further comprises:
a first bending portion bent toward the first antenna unit from an upper end of the first body; and
a first round portion which is formed to be rounded at a lower end of the first body, and has a groove formed at an end thereof,
wherein the housing comprises:
a fixing portion which protrudes from the left portion of the housing to the internal space of the housing, and is located adjacent to the first bending portion; and
a left rib which is formed in an inner side the housing, adjacent to the left surface of the first antenna unit, and partially inserted into the groove.

21. A display device comprising:
a display panel;
a frame positioned behind the display panel, and to which the display panel is coupled; and
a communication module which protrudes from one side of the frame to an outside of the frame, and extends along the one side of the frame,
wherein the communication module comprises:
an antenna unit;
a housing which provides an internal space in which the antenna unit is positioned; and
a side member which is positioned between a side surface of the antenna unit and an inner side of the housing,
wherein the antenna unit comprises:
a first antenna unit; and
a second antenna unit which is spaced apart from the first antenna unit, in a length direction of the communication module,
wherein the first antenna unit and the second antenna unit have a different polarization characteristic, and
wherein the first antenna unit is adjacent to a left portion of the housing, has a first width defined in a left-right direction, and has a first height which is defined in an up-down direction and is smaller than the first width,
wherein the first antenna unit comprises:
a plurality of first front antennas provided on a front surface of the first antenna unit; and
a plurality of first left antennas provided on a left surface of the first antenna unit,
wherein the side member comprises a first side member disposed between the plurality of first left antennas and the left portion of the housing.

* * * * *